(12) United States Patent
Hu et al.

(10) Patent No.: US 11,930,532 B2
(45) Date of Patent: Mar. 12, 2024

(54) BEAM MANAGEMENT AND BEAM FAILURE RECOVERY IN NEW RADIO-UNLICENSED AT 60 GIGAHERTZ

(71) Applicant: Samsung Electronics Co., Ltd., Gyeonggi-do (KR)

(72) Inventors: Liang Hu, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 100 days.

(21) Appl. No.: 17/481,865

(22) Filed: Sep. 22, 2021

(65) Prior Publication Data

US 2022/0124807 A1  Apr. 21, 2022

Related U.S. Application Data

(60) Provisional application No. 63/131,175, filed on Dec. 28, 2020, provisional application No. 63/092,719, filed on Oct. 16, 2020.

(51) Int. Cl.
| | |
|---|---|
| *H04W 74/08* | (2009.01) |
| *H04L 5/00* | (2006.01) |
| *H04W 72/0446* | (2023.01) |
| *H04W 74/00* | (2009.01) |

(52) U.S. Cl.
CPC ....... *H04W 74/0816* (2013.01); *H04L 5/0051* (2013.01); *H04W 72/0446* (2013.01); *H04W 74/006* (2013.01); *H04W 74/0866* (2013.01)

(58) Field of Classification Search
CPC ......... H04W 74/0816; H04W 72/0446; H04W 74/006; H04W 74/0866; H04W 72/1215; H04W 74/0808; H04L 5/0051; H04B 7/0695; H04B 7/0408; H04B 7/0413
See application file for complete search history.

(56) References Cited

U.S. PATENT DOCUMENTS

| | | | |
|---|---|---|---|
| 8,897,253 B2 | 11/2014 | Shin et al. | |
| 9,264,980 B2 | 2/2016 | Fwu et al. | |
| 2020/0052803 A1* | 2/2020 | Deenoo | H04B 17/318 |
| 2020/0052865 A1* | 2/2020 | Liou | H04W 74/0808 |
| 2020/0107327 A1 | 4/2020 | Wang et al. | |

(Continued)

FOREIGN PATENT DOCUMENTS

| | | |
|---|---|---|
| AU | 2018282267 | 6/2019 |
| AU | 2018282270 | 6/2019 |

(Continued)

*Primary Examiner* — Ivan O Latorre
(74) *Attorney, Agent, or Firm* — The Farrell Law Firm, P.C.

(57) ABSTRACT

Disclosed is an electronic device including at least one processor, and at least one memory operatively connected with the at least one processor, wherein the at least one memory stores instructions, which when executed, instruct the at least one processor to receive, on a control channel, a control channel message, receive a set of reference signals (RSs) in which each RS corresponds to a beam direction, decode the control channel message to obtain a list of transmission state indicator (TCI) state information for one or more slots, wherein each TCI state information comprises a channel occupancy time (COT) duration indicator for each of the slots, and determine, based on the TCI state information list, whether each RS of the set is valid.

11 Claims, 9 Drawing Sheets

(56) References Cited

U.S. PATENT DOCUMENTS

| | | | |
|---|---|---|---|
| 2020/0112978 A1* | 4/2020 | Zhang | H04W 16/14 |
| 2020/0196351 A1* | 6/2020 | Zhou | H04W 72/23 |
| 2020/0267763 A1* | 8/2020 | Deogun | H04W 56/001 |
| 2021/0006372 A1 | 1/2021 | Cha et al. | |
| 2021/0028843 A1 | 1/2021 | Zhou et al. | |
| 2021/0051720 A1* | 2/2021 | Thyagarajan | H04W 72/1268 |
| 2021/0067287 A1* | 3/2021 | Thyagarajan | H04W 16/14 |
| 2021/0160881 A1 | 5/2021 | Rahman et al. | |
| 2021/0352688 A1* | 11/2021 | Luo | H04W 74/0808 |
| 2022/0038218 A1* | 2/2022 | Kim | H04L 5/0048 |
| 2022/0046541 A1* | 2/2022 | Wu | H04W 72/23 |
| 2022/0061031 A1* | 2/2022 | Park | H04L 5/0094 |

FOREIGN PATENT DOCUMENTS

| | | |
|---|---|---|
| EP | 3 497 801 | 6/2019 |
| EP | 3 706 347 | 9/2020 |
| EP | 3 824 666 | 5/2021 |
| WO | WO 2020/041421 | 2/2020 |
| WO | WO 2020/144602 | 7/2020 |
| WO | WO 2020/228970 | 11/2020 |
| WO | WO 2020/253641 | 12/2020 |
| WO | WO 2021/030605 | 2/2021 |
| WO | WO 2021/059162 | 4/2021 |
| WO | WO 2021/093587 | 5/2021 |
| WO | WO-2022071556 A1 * | 4/2022 |
| WO | WO-2022072830 A1 * | 4/2022 |
| WO | WO-2022078605 A1 * | 4/2022 |
| WO | WO-2022080736 A1 * | 4/2022 |

* cited by examiner

BEAM MANAGEMENT AND BEAM FAILURE RECOVERY IN NEW RADIO-UNLICENSED AT 60 GIGAHERTZ

PRIORITY

This application is based on and claims priority under 35 U.S.C. § 119(e) to U.S. Provisional Application Ser. Nos. 63/092,719 and 63/131,175, which were filed in the U.S. Patent and Trademark Office on Oct. 16, 2020 and Dec. 28, 2020, respectively, the contents of each of which are incorporated herein by reference.

BACKGROUND

1. Field

The disclosure related generally to wireless communications, and more particularly, to enhancement of legacy beam management procedures to support new radio (NR) beam management procedures unlicensed at the 60 Gigahertz (GHz) band.

2. Description of Related Art

Unlike legacy beam management in NR, beam management procedures in NR-unlicensed at 60 GHz (hereinafter, NR-U-60) needs to consider a new concept of channel occupancy time (COT) defined in the third generation partnership project (3GPP) telecommunications standard Release 16 (Rel-16) NR-U according to which a user equipment (UE) cannot use periodic channel-state information reference signals (CSI-RSs) outside of the COT for beam evaluation.

Furthermore, in NR-U-60, some periodic reference signals, such as a CSI-RS and a synchronization signals (SS)/physical broadcast channel (PBCH) resource block for beam management may not be transmitted due to listen before talk (LBT). Therefore, the legacy beam management procedures need to be enhanced to support NR-U 60 GHz. Likewise, in a legacy beam failure recovery (BFR) procedure of NR, a UE uses periodic CSI-RS and a synchronization signal block (SSB) for beam failure detection and candidate beam selection. Therefore, the legacy BFR procedures also need to be enhanced to support NR-U 60 GHz.

FIG. 1 illustrates a beam failure detection procedure 100 according to the prior art. As seen in FIG. 1, for beam failure (BF) recovery in NR-U 60 GHz (102), if consideration is only given to an RS within the COT (104), the timer (106) for reporting a BF instance will continue running without further BF detection after the COT (104), which could the delay the beam recovery procedure. Also, the number of RS samples within the COT (104), which is three as shown in FIG. 1, is insufficient.

In the third generation partnership project (3GPP) radio access network 1 (RAN1) #102e status on beam management in NR-U-60 GHz, several aspects in system operations with beams has been considered. For example, BFR mechanism enhancements, if supported, have been studied. This concerns the use of aperiodic CSI-RS for BFR, increased number of RSs for monitoring/candidates and efficient utilization of the increased number of RSs, and enhanced reliability to cope with narrower beamwidth. In addition, UE capabilities on beam switch timing in a beam management procedure, enhancements for beam management and corresponding RSs in the DL and uplink (UL) based on beam switching time, beam alignment delay (including initial access), LBT failure, and potential coverage loss (if large SCS is supported), and beam switching gap handling for signals/channels (e.g. CSI-RS, physical downlink shared channel (PDSCH), sounding reference signal (SRS), and physical uplink shared channel (PUSCH) for higher subcarriers spacing, if supported) are under consideration.

Further regarding beam management, the use of aperiodic CSI-RS for BFR procedure in NR-U-60, the beam adjustment mechanism in an initial access procedure, and potential enhancements for beam management CSI-RS or SRS considering beam switching time and coverage loss for a large SCS are under consideration.

Additionally, an SSB beam may not be narrow enough considering large propagation loss. In order to improve the coverage performance of DL transmissions following SSB during initial access, beam refinement during initial access may be beneficial.

Any BFR procedure enhancement is considered in view of the number of candidate beams included in a set q1, the minimum time gap to apply a new beam configuration after receiving BFR response from a g node B (gNB), simultaneous update of beam configuration for multiple secondary cells (SCells) and monitoring aperiodic transmissions for beam failure detection.

For P-TRS transmissions in the cell, a mechanism for transmitting P-TRSs dropped due to LBT failure would be beneficial.

Applied coexistence mechanisms should be clarified before impact on beam management and the CSI measurement and reporting framework can be fully evaluated.

As the UE moves in a cell, the likelihood of blockage and beam mis-alignment increases with decreasing beamwidths used by the gNB.

Connectivity and robustness improvements are being developed for FR2 in the multiple input multiple output (MIMO) technology under multi-beam enhancements and multi-total radiated power (multi-TRP) agenda items, and those improvements may also be valid solutions above 52.6 GHz operation.

In the 3GPP RAN1 #103e status on beam management in NR-U-60 GHz, it has been observed that due to the narrow beamwidth in higher frequencies, a UE may experience reliability issues to recover dynamic blockage via the existing BFR operation. Thus, several proposals have been made. For example, enhanced BFR operation to provide better reliability and efficiency for higher frequencies, potential enhancements for SRS, configured grant physical uplink shared channel (CG-PUSCH) and group common physical downlink control channel (GC-PDCCH) spatial relation updating mechanisms, and if new subcarrier spacing is introduced, requiring the UE to provide a timeDuration-ForQCL (quasi co-located) message for that subcarrier spacing. That is, two antenna ports are said to be quasi co-located (or QCL'ed) if properties of the channel over which a symbol on one antenna port is conveyed can be inferred from the channel over which a symbol on the other antenna port is conveyed (This application concerns the QCL-Type D which reflects spatial receiver parameter channel properties and is applied to support beamforming).

Further discussed in 3GPP technical report (TR) 38.808, for operation in the 52.6-71 GHz band, due to the large number of beams expected to be used, it is beneficial to enhance triggering of aperiodic CSI-RS and SRS resources to support flexible multi-slot triggering with a single piece of downlink control information (DCI).

Other proposals are the potential enhancements for beam management CSI-RS or SRS considering beam switching time and coverage loss for large SCS, support of multiple aperiodic A-CSI-RS to mitigate the problem of LBT failure or enable gNB scheduling flexibility in the bidirectional-forwarding detection (BFD) protocol, modification of the hypothetical PDCCH used in BFD when the RS for BFD is not sent by the gNB, and modification of the following capabilities/concepts based on the SCSs selected and the need for symbol level beam switching:

BeamSwitchTiming, BeamReportTiming, TimeDuration-forQCL, maxNumberRxTxBeamSwitchDL, tdd-MultiDL-UL-SwitchPerSlot, SFI Pattern It has also been proposed that aperiodic CSI-RS be unused for BFR, and that RAN1 shall consider the beam adjustment mechanism in initial access procedure to alleviate a beam alignment delay.

It has been further observed in the 3GPP RAN1 #103e that the SSB beam may not be narrow enough for subsequent transmissions considering large propagation loss. Therefore, it has been proposed that coverage enhancements for transmissions during initial access be considered, and that BFR procedure enhancement should be considered based on the number of candidate beams included in a set, the minimum time gap to apply a new beam configuration after receiving a BFR response from the gNB, simultaneous update of beam configuration for multiple SCells, and monitoring aperiodic transmissions for beam failure detection.

Regarding BFR disclosed in NR release 15 (Rel-15, according to TS 38.321 beam failure recovery and TS 38.213 clause 6, beam failure detection sets forth that the UE is provided with a set a set $\bar{q}_0$ of periodic CSI-RS resource configuration indices by failureDetectionResources, the UE assesses the radio link quality according to the set $\bar{q}_0$ of resource configurations against the threshold $Q_{out,LR}$, and the physical layer informs the higher layers when the radio link quality is worse than the threshold $Q_{out,LR}$ with a specified periodicity.

FIG. 2 illustrates beam failure detection timer operation 200, according to the prior art. For each beam failure indication from a lower physical layer (PHY), a beamFailureDetectionTimer will be (re)started (205), and a BFI_COUNTER will be increased by 1. Before the beamFailureDetectionTimer expires, if a BFI_COUNTER>=beamFailureInstanceMaxCount (210), a random access procedure is initiated on a special cell (SpCell) or BFR on the SCell. As to search for the next beam, Rel-15 sets forth that for the PCell or the PSCell, upon request from higher layers, the UE provides to higher layers the periodic CSI-RS configuration indices and/or SS/PBCH block indices from the set $\bar{q}_1$ and the corresponding L1-reference signal received power (RSRP) measurements that are greater than or equal to the $Q_{in,LR}$ threshold.

As to the random access procedure related to beam failure recovery, Rel-15 sets forth that a beam and the associated RA resource for preamble transmission are selected, and for random access response (RAR) reception, beam recovery is complete if a specific DCI is received within the RAR window. Otherwise, it is considered that the random access procedure is not completed and the RA resource selection procedure is performed after a back-off time. If the RACH procedure for beam recovery is not completed after a certain number of trials, the RACH procedure is ended.

As to the CSI-AperiodicTriggerStateList in 3GPP technical specification (TS) 38.331, the following teachings are provided. The CSI-AperiodicTriggerStateList IE is used to configure the UE with a list of aperiodic trigger states. Each codepoint of the DCI field "CSI request" is associated with one trigger state (see TS 38.321, clause 6.1.3.13). Upon reception of the value associated with a trigger state, the UE will perform measurement of CSI-RS, CSI-interference measurement (CSI-IM) and/or SSB (reference signals) and aperiodic reporting on L1 according to all entries in the associatedReportConfigInfoList for that trigger state.

CSI-AperiodicTriggerStateList Information Element

```
-- ASN1START
-- TAG-CSI-APERIODICTRIGGERSTATELIST-START
CSI-AperiodicTriggerStateList ::= SEQUENCE (SIZE (1..maxNrOfCSI-AperiodicTriggers)) OF
CSI-AperiodicTriggerState
CSI-AperiodicTriggerState ::=   SEQUENCE {
    associatedReportConfigInfoList                                          SEQUENCE
(SIZE(1..maxNrofReportConfigPerAperiodicTrigger)) OF CSI-AssociatedReportConfigInfo,
    ...
}
CSI-AssociatedReportConfigInfo ::= SEQUENCE {
    reportConfigId              CSI-ReportConfigId,
    resourcesForChannel         CHOICE {
        nzp-CSI-RS              SEQUENCE {
            resourceSet         INTEGER (1..maxNrofNZP-CSI-RS-ResourceSetsPerConfig),
            qcl-info            SEQUENCE (SIZE(1..maxNrofAP-CSI-RS-ResourcesPerSet))
OF TCI-StateId
                                                        OPTIONAL -- Cond Aperiodic
        },
        csi-SSB-ResourceSet     INTEGER (1..maxNrofCSI-SSB-ResourceSetsPerConfig)
    },
    csi-IM-ResourcesForInterference  INTEGER(1..maxNrofCSI-IM-ResourceSetsPerConfig)
                                                        OPTIONAL,  -- Cond  CSI-IM-
ForInterference
    nzp-CSI-RS-ResourcesForInterference    INTEGER    (1..maxNrofNZP-CSI-RS-
ResourceSetsPerConfig)
                                                        OPTIONAL,  -- Cond  NZP-CSI-RS-
ForInterference
    ...
}
-- TAG-CSI-APERIODICTRIGGERSTATELIST-STOP
-- ASN1STOP
```

| CSI-AssociatedReportConfigInfo field descriptions are as follows: |
|---|
| csi-IM-ResourcesForInterference<br>CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (value 1 corresponds to the first entry, value 2 to the second entry, and so on). The indicated CSI-IM-ResourceSet should have exactly the same number of resources like the NZP-CSI-RS-ResourceSet indicated in nzp-CSI-RS-ResourcesforChannel.<br>csi-SSB-ResourceSet<br>CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (value 1 corresponds to the first entry, value 2 to the second entry, and so on).<br>nzp-CSI-RS-ResourcesForInterference<br>NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (value 1 corresponds to the first entry, value 2 to the second entry, and so on).<br>qcl-info<br>List of references to transmission state indicator (TCI) states for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214, clause 5.2.1.5.1)<br>reportConfigId<br>The reportConfigId of one of the CSI-ReportConfigToAddMod configured in CSI-MeasConfig<br>resourceSet<br>NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (value 1 corresponds to the first entry, value 2 to the second entry, and so on). |

1.1.1.1 SRS-Config

The IE SRS-Config is used to configure sounding reference signal transmissions or to configure sounding reference signal measurements for cross link interference (CLI). The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI).

SRS-Config Information Element (IE)

```
-- ASN1START
-- TAG-SRS-CONFIG-START
SRS-Config ::=                    SEQUENCE {
    srs-ResourceSetToReleaseList      SEQUENCE (SIZE(1..maxNrofSRS-ResourceSets)) OF
SRS-ResourceSetId    OPTIONAL,    -- Need N
    srs-ResourceSetToAddModList       SEQUENCE (SIZE(1..maxNrofSRS-ResourceSets))
OF SRS-ResourceSet    OPTIONAL,   -- Need N
    srs-ResourceToReleaseList       SEQUENCE (SIZE(1..maxNrofSRS-Resources)) OF
SRS-ResourceId       OPTIONAL,    -- Need N
    srs-ResourceToAddModList         SEQUENCE (SIZE(1..maxNrofSRS-Resources)) OF
SRS-Resource       OPTIONAL, -- Need N
    tpc-Accumulation                   ENUMERATED {disabled}
OPTIONAL, -- Need S
    ...,
    [[
    srs-RequestForDCI-Format1-2-r16      INTEGER (1..2)
OPTIONAL, -- Need S
    srs-RequestForDCI-Format0-2-r16      INTEGER (1..2)
OPTIONAL, -- Need S
    srs-ResourceSetToAddModListForDCI-Format0-2-r16 SEQUENCE (SIZE(1..maxNrofSRS-
ResourceSets)) OF SRS-ResourceSet OPTIONAL, -- Need N
    srs-ResourceSetToReleaseListForDCI-Format0-2-r16 SEQUENCE (SIZE(1..maxNrofSRS-
ResourceSets)) OF SRS-ResourceSetId OPTIONAL,-- Need N
    srs-PosResourceSetToReleaseList-r16   SEQUENCE (SIZE(1..maxNrofSRS-
PosResourceSets-r16)) OF SRS-PosResourceSetId-r16
                                                                  OPTIONAL, -- Need N
    srs-PosResourceSetToAddModList-r16   SEQUENCE (SIZE(1..maxNrofSRS-
PosResourceSets-r16)) OF SRS-PosResourceSet-r16 OPTIONAL,-- Need N
    srs-PosResourceToReleaseList-r16   SEQUENCE (SIZE(1..maxNrofSRS-PosResources-
r16)) OF SRS-PosResourceId-r16 OPTIONAL,-- Need N
    srs-PosResourceToAddModList-r16   SEQUENCE (SIZE(1..maxNrofSRS-PosResources-
r16)) OF SRS-PosResource-r16 OPTIONAL -- Need N
    ]]
}
SRS-ResourceSet ::=                SEQUENCE {
```

-continued

```
    srs-ResourceSetId              SRS-ResourceSetId,
    srs-ResourceIdList             SEQUENCE (SIZE(1..maxNrofSRS-ResourcesPerSet)) OF
SRS-ResourceId OPTIONAL, -- Cond Setup
      resourceType                 CHOICE {
        aperiodic                  SEQUENCE {
          aperiodicSRS-ResourceTrigger    INTEGER (1..maxNrofSRS-TriggerStates-1),
          csi-RS                   NZP-CSI-RS-ResourceId                 OPTIONAL, --
Cond NonCodebook
          slotOffset               INTEGER (1..32)                       OPTIONAL, --
Need S
        ...,
        [[
          aperiodicSRS-ResourceTriggerList    SEQUENCE (SIZE(1..maxNrofSRS-
TriggerStates-2))
                                   OF INTEGER (1..maxNrofSRS-TriggerStates-1)
OPTIONAL -- Need M
        ]]
      },
      semi-persistent              SEQUENCE {
        associatedCSI-RS                NZP-CSI-RS-ResourceId
OPTIONAL, - Cond NonCodebook
        ...
      },
      periodic                     SEQUENCE {
        associatedCSI-RS                NZP-CSI-RS-ResourceId
OPTIONAL, -- Cond NonCodebook
        ...
      }
    },
    usage                ENUMERATED {beamManagement, codebook, nonCodebook,
antennaSwitching},
    alpha                     Alpha                         OPTIONAL, -- Need S
    p0                        INTEGER (−202..24)            OPTIONAL, --
Cond Setup
    pathlossReferenceRS            PathlossReferenceRS-Config
OPTIONAL, -- Need M
    srs-PowerControlAdjustmentStates   ENUMERATED { sameAsFci2,
separateClosedLoop}            OPTIONAL, -- Need S
    ...,
    [[
    pathlossReferenceRS-List-r16     SEQUENCE (SIZE(1..maxNrofSRS-
PathlossReferenceRS-r16-1)) OF PathlossReferenceRS-Config
                                                       OPTIONAL -- Need M
    ]]
}
PathlossReferenceRS-Config ::=    CHOICE {
  ssb-Index                       SSB-Index,
  csi-RS-Index                    NZP-CSI-RS-ResourceId
}
SRS-PosResourceSet-r16 ::=        SEQUENCE {
  srs-PosResourceSetId-r16        SRS-PosResourceSetId-r16,
  srs-PosResourceIdList-r16       SEQUENCE (SIZE(1..maxNrofSRS-ResourcesPerSet))
OF SRS-PosResourceId-r16                               OPTIONAL, -- Cond Setup
      resourceType-r16            CHOICE {
        aperiodic-r16             SEQUENCE {
          aperiodicSRS-ResourceTriggerList-r16   SEQUENCE (SIZE(1..maxNrofSRS-
TriggerStates-1))
                                   OF INTEGER (1..maxNrofSRS-TriggerStates-1)
OPTIONAL, -- Need M
          slotOffset-r16          INTEGER (1..32)                       OPTIONAL, --
Need S
        ...
      },
      semi-persistent-r16         SEQUENCE {
        ...
      },
      periodic-r16                SEQUENCE {
        ...
      }
    },
    alpha-r16                     Alpha                         OPTIONAL, -- Need S
    p0-r16                        INTEGER (−202..24)            OPTIONAL, --
Cond Setup
    pathlossReferenceRS-Pos-r16   CHOICE {
      ssb-Index-16                SSB-Index,
      csi-RS-Index-r16            NZP-CSI-RS-ResourceId,
      ssb-r16                     SSB-InfoNcell-r16,
      dl-PRS-r16                  DL-PRS-Info-r16
    }                                                  OPTIONAL, -- Need M
```

```
...
}
SRS-ResourceSetId ::=                  INTEGER (0..maxNrofSRS-ResourceSets-1)
SRS-PosResourceSetId-r16 ::=           INTEGER (0..maxNrofSRS-PosResourceSets-1-r16)
SRS-Resource ::=                       SEQUENCE {
   srs-ResourceId                         SRS-ResourceId,
   nrofSRS-Ports                          ENUMERATED {port1, ports2, ports4},
   ptrs-PortIndex                         ENUMERATED {n0, n1 }
OPTIONAL, -- Need R
   transmissionComb                       CHOICE {
      n2                                  SEQUENCE {
         combOffset-n2                       INTEGER (0..1),
         cyclicShift-n2                      INTEGER (0..7)
      },
      n4                                  SEQUENCE {
         combOffset-n4                       INTEGER (0..3),
         cyclicShift-n4                      INTEGER (0..11)
      }
   },
   resourceMapping                        SEQUENCE {
      startPosition                          INTEGER (0..5),
      nrofSymbols                            ENUMERATED {n1, n2, n4},
      repetitionFactor                       ENUMERATED {n1, n2, n4}
   },
   freqDomainPosition                     INTEGER (0..67),
   freqDomainShift                        INTEGER (0..268),
   freqHopping                            SEQUENCE {
      c-SRS                                  INTEGER (0..63),
      b-SRS                                  INTEGER (0..3),
      b-hop                                  INTEGER (0..3)
   },
   groupOrSequenceHopping                 ENUMERATED { neither, groupHopping,
sequenceHopping },
   resourceType                           CHOICE {
      aperiodic                           SEQUENCE {
         ...
      },
      semi-persistent                     SEQUENCE {
         periodicityAndOffset-sp    SRS-PeriodicityAndOffset,
         ...
      },
      periodic                            SEQUENCE {
         periodicityAndOffset-p     SRS-PeriodicityAndOffset,
         ...
      }
   },
   sequenceId                             INTEGER (0..1023),
   spatialRelationInfo                    SRS-SpatialRelationInfo            OPTIONAL, --
Need R
   ...,
   [[
   resourceMapping-r16                    SEQUENCE {
      startPosition-r16                      INTEGER (0..13),
      nrofSymbols-r16                        ENUMERATED {n1, n2, n4},
      repetitionFactor-r16                   ENUMERATED {n1, n2, n4}
   }                                                                         OPTIONAL -- Need R
   ]]
}
SRS-PosResource-r16::=                 SEQUENCE {
   srs-PosResourceId-r16                  SRS-PosResourceId-r16,
   transmissionComb-r16                   CHOICE {
      n2-r16                              SEQUENCE {
         combOffset-n2-r16                   INTEGER (0..1),
         cyclicShift-n2-r16                  INTEGER (0..7)
      },
      n4-r16                              SEQUENCE {
         combOffset-n4-16                    INTEGER (0..3),
         cyclicShift-n4-r16                  INTEGER (0..11)
      },
      n8-r16                              SEQUENCE {
         combOffset-n8-r16                   INTEGER (0..7),
         cyclicShift-n8-r16                  INTEGER (0..5)
      },
      ...
   },
   resourceMapping-r16                    SEQUENCE {
      startPosition-r16                      INTEGER (0..13),
      nrofSymbols-r16                        ENUMERATED {n1, n2, n4, n8, n12}
   },
```

-continued

```
    freqDomainShift-r16            INTEGER (0..268),
    freqHopping-r16                SEQUENCE {
      c-SRS-r16                    INTEGER (0..63)
    },
    groupOrSequenceHopping-r16     ENUMERATED { neither, groupHopping,
sequenceHopping },
    resourceType-r16               CHOICE {
      aperiodic-r16                SEQUENCE {
        ...
      },
      semi-persistent-r16                    SEQUENCE {
        periodicityAndOffset-sp-r16          SRS-PeriodicityAndOffset-r16,
        ...
      },
      periodic-r16                           SEQUENCE {
        periodicityAndOffset-p-r16           SRS-PeriodicityAndOffset-r16,
        ...
      }
    },
    sequenceId-r16                 INTEGER (0..65535),
    spatialRelationInfoPos-r16     SRS-SpatialRelationInfoPos-r16
OPTIONAL, -- Need R
    ...
}
SRS-SpatialRelationInfo ::= SEQUENCE {
  servingCellId                ServCellIndex                OPTIONAL, -- Need
S
  referenceSignal              CHOICE {
    ssb-Index                  SSB-Index,
    csi-RS-Index               NZP-CSI-RS-ResourceId,
    srs                        SEQUENCE {
      resourceId               SRS-ResourceId,
      uplinkBWP                BWP-Id
    }
  }
}
SRS-SpatialRelationInfoPos-r16 ::= SEQUENCE {
  servingCellId-r16            ServCellIndex    OPTIONAL, -- Need S
  referenceSignal-r16          CHOICE {
    ssb-IndexServing-r16         SSB-Index,
    csi-RS-IndexServing-r16      NZP-CSI-RS-ResourceId,
    srs-SpatialRelation-r16      SEQUENCE {
      resourceSelection-r16        CHOICE {
        srs-ResourceId-r16             SRS-ResourceId,
        srs-PosResourceId-r16      SRS-PosResourceId-r16
      },
      uplinkBWP-r16                BWP-Id
    },
    ssbNcell-r16               SSB-InfoNcell-r16,
    dl-PRS-r16                 DL-PRS-Info-r16
  }
}
SSB-Configuration-r16 ::=      SEQUENCE {
  carrierFreq-r16              ARFCN-ValueNR,
  halfFrameIndex-r16             ENUMERATED {zero, one},
  ssbSubcarrierSpacing-r16       SubcarrierSpacing,
  ssb-periodicity-r16            ENUMERATED { ms5, ms10, ms20, ms40, ms80, ms160,
spare2,spare1 } OPTIONAL, --Need S
  smtc-r16                     SSB-MTC                      OPTIONAL, --
Need S
  sfn-Offset-r16               INTEGER (0..maxNrofFFS-r16),
  sfn-SSB-Offset-r16           INTEGER (0..15),
  ss-PBCH-BlockPower-r16         INTEGER (-60..50)
OPTIONAL -- Cond Pathloss
}
SSB-InfoNcell-r16 ::=          SEQUENCE {
  physicalCellId-r16           PhysCellId,
  ssb-IndexNcell-r16           SSB-Index,
  ssb-Configuration-r16        SSB-Configuration-r16
OPTIONAL -- Need M
}
DL-PRS-Info-r16 ::=            SEQUENCE {
  trp-Id-r16                 INTEGER (0..255),
  dl-PRS-ResourceSetId-r16     INTEGER (0..7),
  dl-PRS-ResourceId-r16        INTEGER (0..63)
OPTIONAL -- Cond Pathloss
}
SRS-ResourceId ::=             INTEGER (0..maxNrofSRS-Resources-1)
SRS-PosResourceId-r16 ::=          INTEGER (0..maxNrofSRS-PosResources-1-r16)
```

-continued

```
SRS-PeriodicityAndOffset ::=    CHOICE {
    sl1                         NULL,
    sl2                         INTEGER(0..1),
    sl4                         INTEGER(0..3),
    sl5                         INTEGER(0..4),
    sl8                         INTEGER(0..7),
    sl10                        INTEGER(0..9),
    sl16                        INTEGER(0..15),
    sl20                        INTEGER(0..19),
    sl32                        INTEGER(0..31),
    sl40                        INTEGER(0..39),
    sl64                        INTEGER(0..63),
    sl80                        INTEGER(0..79),
    sl160                       INTEGER(0..159),
    sl320                       INTEGER(0..319),
    sl640                       INTEGER(0..639),
    sl1280                      INTEGER(0..1279),
    sl2560                      INTEGER(0..2559)
}
SRS-PeriodicityAndOffset-r16 ::=  CHOICE {
    sl1                         NULL,
    sl2                         INTEGER(0..1),
    sl4                         INTEGER(0..3),
    sl5                         INTEGER(0..4),
    sl8                         INTEGER(0..7),
    sl10                        INTEGER(0..9),
    sl16                        INTEGER(0..15),
    sl20                        INTEGER(0..19),
    sl32                        INTEGER(0..31),
    sl40                        INTEGER(0..39),
    sl64                        INTEGER(0..63),
    sl80                        INTEGER(0..79),
    sl160                       INTEGER(0..159),
    sl320                       INTEGER(0..319),
    sl640                       INTEGER(0..639),
    sl1280                      INTEGER(0..1279),
    sl2560                      INTEGER(0..2559),
    sl5120                      INTEGER(0..5119),
    sl10240                     INTEGER(0..10239),
    sl40960                     INTEGER(0..40959),
    sl81920                     INTEGER(0..81919),
    ...
}
-- TAG-SRS-CONFIG-STOP
-- ASN1STOP
```

SRS-Resource field descriptions are as follows:

cyclicShift-n2
Cyclic shift configuration (see TS 38.214, clause 6.2.1).
cyclicShift-n4
Cyclic shift configuration (see TS 38.214, clause 6.2.1).
freqHopping
Includes parameters capturing SRS frequency hopping (see TS 38.214, clause 6.2.1). For CLI SRS-RSRP measurement, the network always configures this field such that b-hop > b-SRS.
groupOrSequenceHopping
Parameter(s) for configuring group or sequence hopping (see TS 38.211, clause 6.4.1.4.2). For CLI SRS-RSRP measurement, the network always configures this parameter to 'neither'.
nrofSRS-Ports
Number of ports. For CLI SRS-RSRP measurement, the network always configures this parameter to 'port1'.
periodicityAndOffset-p
Periodicity and slot offset for this SRS resource. All values are in "number of slots". Value sl1 corresponds to a periodicity of 1 slot, value sl2 corresponds to a periodicity of 2 slots, and so on. For each periodicity, the corresponding offset is given in number of slots. For periodicity sl1 the offset is 0 slots (see TS 38.214, clause 6.2.1). For CLI SRS-RSRP measurement, sl1280 and sl2560 cannot be configured.
periodicityAndOffset-sp
Periodicity and slot offset for this SRS resource. All values are in "number of slots". Value sl1 corresponds to a periodicity of 1 slot, value sl2 corresponds to a periodicity of 2 slots, and so on. For each periodicity, the corresponding offset is given in number of slots. For periodicity sl1 the offset is 0 slots (see TS 38.214, clause 6.2.1).
ptrs-PortIndex
The PTRS port index for this SRS resource for non-codebook based UL MIMO. This is only applicable when the corresponding PTRS-UplinkConfig is set to CP-OFDM. The ptrs-PortIndex configured here must be smaller than the maxNrofPorts configured in the PIRS-UplinkConfig

| SRS-Resource field descriptions are as follows: |
|---|

(see TS 38.214, clause 6.2.3.1). This parameter is not applicable to CLI SRS-RSRP measurement.
resourceMapping
OFDM symbol location of the SRS resource within a slot including nrofSymbols (number of OFDM symbols), startPosition (value 0 refers to the last symbol, value 1 refers to the second last symbol, and so on) and repetitionFactor (see TS 38.214, clause 6.2.1 and TS 38.211, clause 6.4.1.4). The configured SRS resource does not exceed the slot boundary. If resourceMapping-r16 is signaled, UE shall ignore the resourceMapping (without suffix). For CLI SRS-RSRP measurement, the network always configures nrofSymbols and repetitionFactor to 'n1'.
resourceType
Periodicity and offset for semi-persistent and periodic SRS resource (see TS 38.214, clause 6.2.1). For CLI SRS-RSRP measurement only 'periodic' is applicable for resourceType.
sequenceId
Sequence ID used to initialize pseudo random group and sequence hopping (see TS 38.214, clause 6.2.1).
spatialRelationInfo
Configuration of the spatial relation between a reference RS and the target SRS. Reference RS can be SSB/CSI-RS/SRS (see TS 38.214, clause 6.2.1). This parameter is not applicable to CLI SRS-RSRP measurement.
spatialRelationInfoPos
Configuration of the spatial relation between a reference RS and the target SRS. Reference RS can be SSB/CSI-RS/SRS/DL-PRS (see TS 38.214, clause 6.2.1).
srs-RequestForDCI-Format0-2
Indicate the number of bits for "SRS request" in DCI format 0_2. When the field is absent, then the value of 0 bit for "SRS request" in DCI format 0_2 is applied. If the parameter srs-RequestForDCI-Format0-2 is configured to value 1, 1 bit is used to indicate one of the first two rows of Table 7.3.1.1.2-24 in TS 38.212 for triggered aperiodic SRS resource set. If the value 2 is configured, 2 bits are used to indicate one of the rows of Table 7.3.1.1.2-24 in TS 38.212. When a UE is configured with supplementaryUplink, an extra bit (the first bit of the SRS request
field) is used for the non-SUL/SUL indication.
srs-RequestForDCI-Format1-2
Indicate the number of bits for "SRS request" in DCI format 1_2. When the field is absent, then the value of 0 bit for "SRS request" in DCI format 1_2 is applied. When the UE is configured with supplementaryUplink, an extra bit (the first bit of the SRS request field) is used for the non-
SUL/SUL indication (see TS 38.214, clause 6.1.1.2).
srs-ResourceSetToAddModListForDCI-Format0-2
List of SRS resource set to be added or modified for DCI format 0_2 (see TS 38.212, clause 7.3.1).
srs-ResourceSetToReleaseListForDCI-Format0-2
List of SRS resource set to be released for DCI format 0_2 (see TS 38.212, clause 7.3.1).
transmissionComb
Comb value (2 or 4 or 8) and comb offset (0 . . . combValue − 1) (see TS 38.214, clause 6.2.1).

Referring back to FIG. 1 in which the number of RS samples within the COT is insufficient, there are other issues concerning the use of a beam management procedure, beam measurement and reporting based on aperiodic CSI-RS to overcome the problem of periodic measurement reliance in the prior art. For example, aperiodic CSI-RS requires DCI reception, which is not possible in a beam failure scenario using the legacy BFR procedure. As such, the current periodic CSI-RS validation rules, which require a COT, a slot format indication (SFI), or other downlink (DL) transmission information, are ineffective in beam failure scenarios.

Thus, there is a need in the art for enhancement of legacy beam management procedures to support NR beam management procedures unlicensed at the 60 GHz band.

SUMMARY

The present disclosure has been made to address at least the above-mentioned problems and/or disadvantages and to provide at least the advantages described below.

Accordingly, an aspect of the present disclosure is to provide a method for enabling multi-slot aperiodic CSI-RS and SRS for beam management and beam failure recovery in NR-U 60 GHz.

According to another aspect of the disclosure, a channel access and CSI-RS validation method is provided for periodic and aperiodic CSR-RS transmissions.

According to another aspect of the disclosure, a method is provided for cross-carrier CSI-RS validation for beam failure recovery.

According to another aspect of the disclosure, additional UE behaviors are provided for when LBT free CSI-RS transmissions in an LBT mandatory mode can be used for beam management and beam failure recovery.

In accordance with an aspect of the disclosure, an electronic device includes at least one processor, and at least one memory operatively connected with the at least one processor, wherein the at least one memory stores instructions, which when executed, instruct the at least one processor to receive, on a control channel, a control channel message, receive a set of reference signals (RSs) in which each RS corresponds to a beam direction corresponding to a transmission state indicator (TCI) state, decode the control channel message to obtain a list of beam specific channel occupancy information for one or more slots after gNB successfully performed LBT over that beam direction, wherein beam specific channel occupancy information comprises a channel occupancy time (COT) indicator for each of the slots, and determine, based on the beam specific channel occupancy information list, whether each RS of the set is valid.

In accordance with another aspect of the disclosure, a system includes a device configured to receive, from a base station, a set of reference signals (RSs) and a control channel message, the control channel message notifying a slot format, a channel occupancy time (COT) duration, an available resource block set, and search space group switching, per a beam direction or a TCI state, for signal transmission and reception by the device, receive the set of RSs in which each RS corresponds to a beam direction, decode the control channel message to obtain a list of beam-specific COT information for one or more slots, each beam direction corresponding to a TCI state information including a COT information indicator for each of the slots, and determine, based on the beam specific COT information list, whether each RS of the set is valid.

In accordance with another aspect of the disclosure, a base station includes at least one processor, and at least one memory operatively connected with the at least one processor, the at least one memory storing instructions, which when executed, instruct the at least one processor to perform an LBT channel access using at least one broad beam which is quasi co-located (QCL'ed) with each of a subset of synchronization signal block (SSB) beams that is transmitted in a COT, and perform the LBT with the broad beam by using a lower energy detection threshold than an energy detection threshold used in a narrow beam.

In accordance with another aspect of the disclosure, an electronic device includes at least one processor, and at least one memory operatively connected with the at least one processor, the at least one memory storing instructions, which when executed, instruct the at least one processor to receive, from a base station, on a control channel, information notifying a slot format, a channel occupancy time duration, an available resource block set, and search space group switching, per a directional beam or a TCI state, for signal transmission and reception by the electronic device, or information notifying the slot format, the channel occupancy time duration, the available resource block set, and the search space group switching, per the directional beam or the TCI state, and information notifying frequency and time resources of listen before talk-free aperiodic CSI-RS resource indices, or information triggering cross-carrier CSI-RS validation of CSI-RS transmissions from a set of the CSI-RS resource indices, decode the control channel, and identify, by decoding the control channel, the slot format, the channel occupancy time duration, the available resource block set, and the search space group switching, or the slot format, the channel occupancy time duration, the available resource block set, the search space group switching, and the frequency and time resources of the listen before talk-free CSI-RS resource indices, or the cross-carrier CSI-RS validation of the CSI-RS transmissions from the set of the CSI-RS resource indices.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

Figure 1:
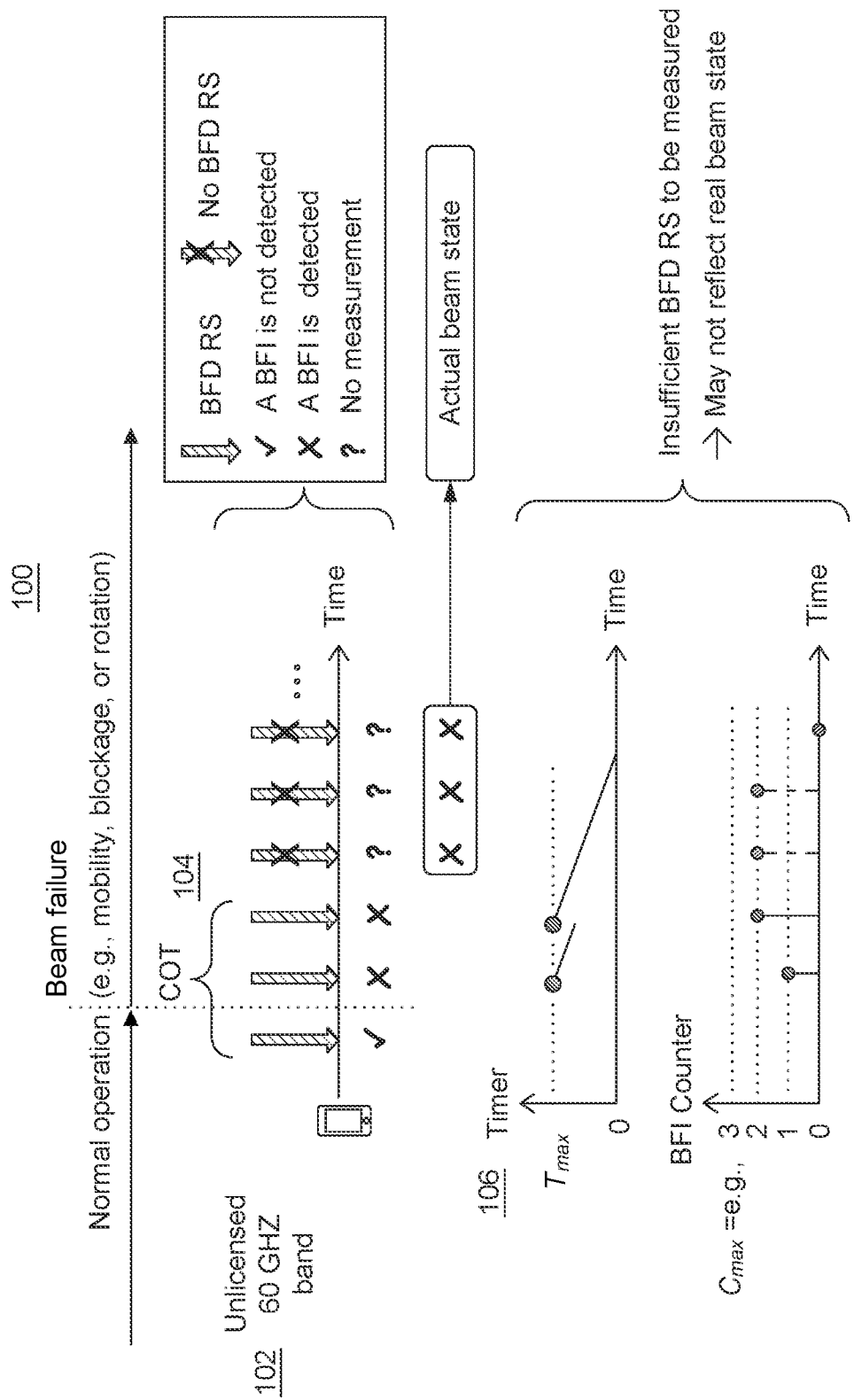
FIG. 1 illustrates a beam failure detection procedure 100 according to the prior art.
Figure 2:
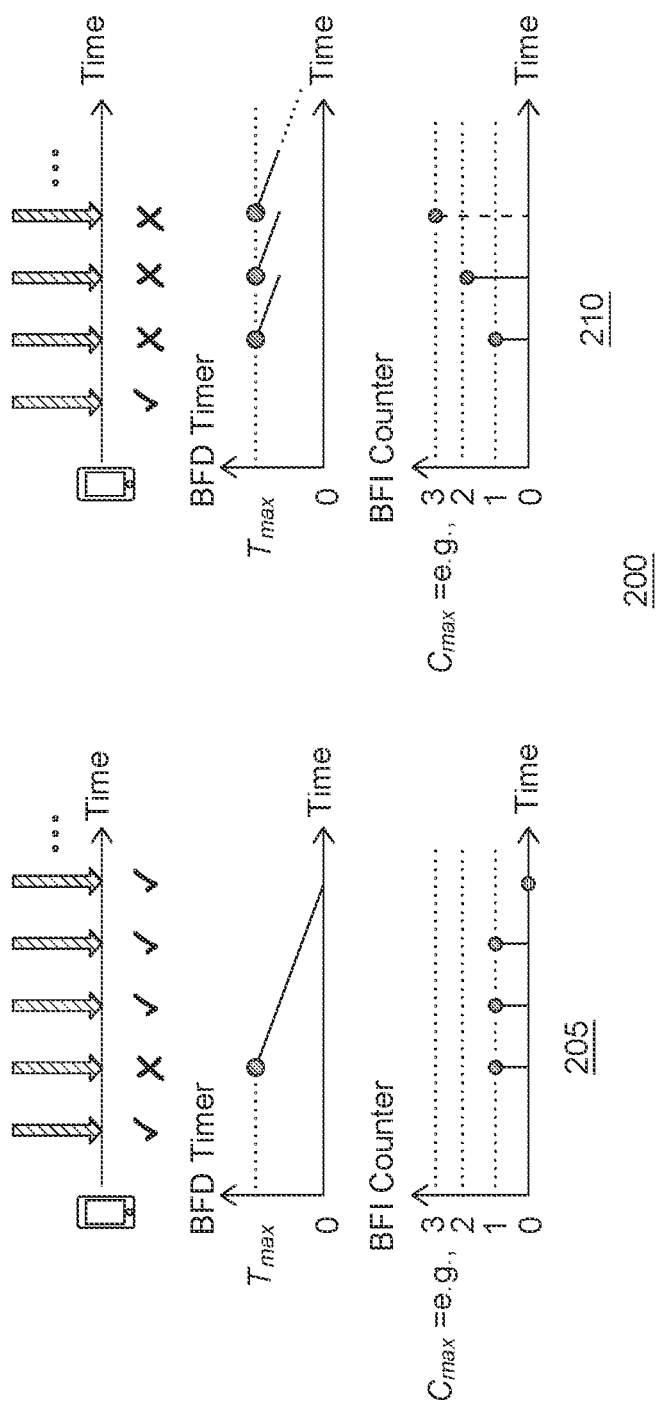
FIG. 2 illustrates beam failure detection timer operation, according to the prior art.
Figure 3:
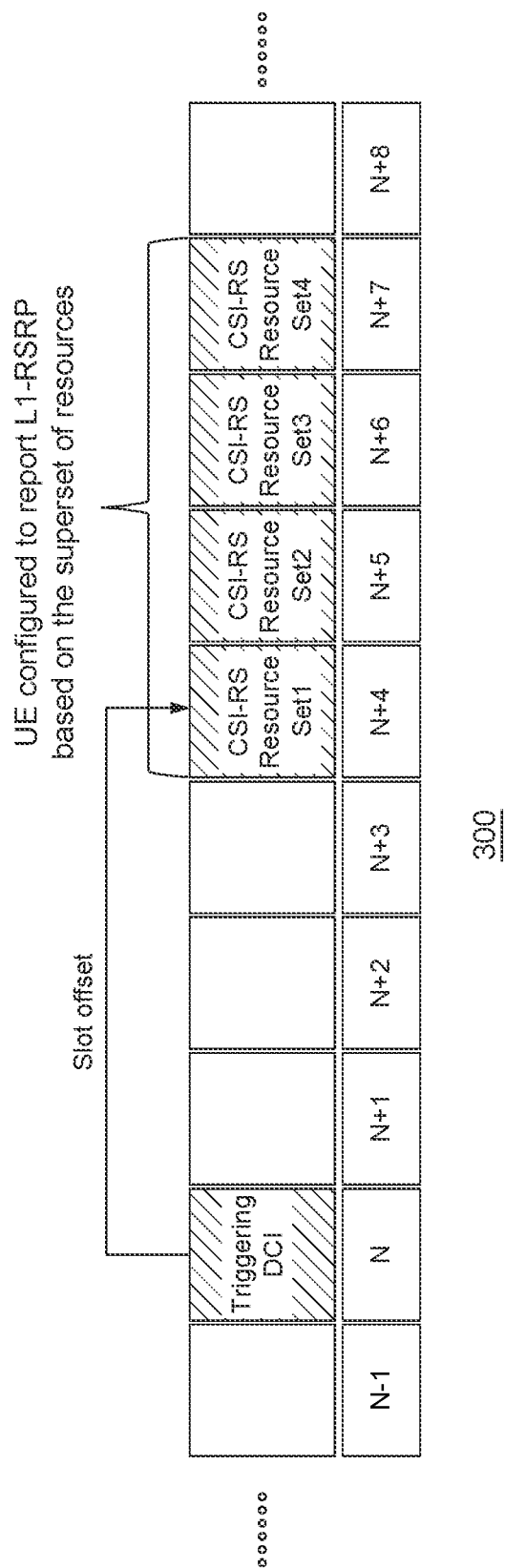
FIG. 3 illustrates a single DCI schedule multi-slot aperiodic CSI-RS, according to an embodiment.

FIG. 3 illustrates a single DCI schedule multi-slot aperiodic CSI-RS (300), according to an embodiment.

Specifically, in legacy NR, beam management is based on periodical RS signals, which may require explicit RS signal validation as to the NR unlicensed operation. Alternatively, for beam management in NR-unlicensed 60 GHz, it is beneficial to trigger multi-slot aperiodic CSI-RS and SRS resources for beam management with a single DCI. With a large SCS and a short slot duration, the single DCI scheduling multi-slot aperiodic CSI-RS can reduce the overhead and frequent UE PDCCH monitoring. This is further motivated by the fact that for operation in a 52.6-71 GHz band, a large number of beams are expected to be used; hence, it is beneficial to be able to trigger (schedule) those resources over multiple slots. In this case, the UE is configured to measure and report over the aggregated (super set) of resources spanning those slots, e.g., reporting the top-N beams and their associated RSRPs. Rel-15 and Rel-16 support triggering of multiple CSI reports (e.g., L1-RSRP reports) with a single DCI, where each report is linked to a single CSI-RS resource set confined to a single slot; however, the UE prepares separate L1-RSRP reports corresponding to each resource set.

For NR 60 GHz, this functionality is enhanced to trigger multiple CSI-RS sets associated with the same CSI report. With this enhancement, the UE may evaluate best beam or the top-N beams over the aggregate (super-set) of CSI-RS resources.

In FIG. 3, the legacy CSI_request codepoint in DCI for aperiodic CSI-RS triggering has 6 bits, which are used to indicate one of the CSI trigger states in the CSI-AperiodicTriggerStateList (the maximum size is 64) configured for a specific UE For aperiodic CSI, each trigger state configured using the higher layer parameter CSI-AperiodicTriggerState is associated with one or multiple CSI-ReportConfig, where each CSI-ReportConfig is linked to aperiodic resource setting(s) for aperiodic CS-RS transmission and reporting.

In a 1$^{st}$ solution, the legacy resource set definition and CSI-RS resource mappings defined for a single slot are re-used, and the legacy CSI-ResourceConfig for configuring the superset of CSI-RS resources is changed to be triggered by a single DCI instead of single slot CSI-RS resource set. In particular, a set of new CSI trigger states is added in addition to the existing 64 states in the CSI-AperiodicTriggerStateList, which are dedicated for the aperiodic CSI-RS scheduling with the superset of resources and is pre-configured with the UE via RRC signaling. For example, for single DCI scheduling the super resource set consisting of X (X>1) slot of CSI-RS resource sets, a set of new CSI trigger states is added to the existing 64 states in the CSI-AperiodicTriggerStateList. In this case, the CSI_request codepoint in DCI should be extended to a few more bits, whereas the CSI-AperiodicTriggerStateList should be extended with a maximum size of larger than 64 states.

Another embodiment is to reserve a set of CSI trigger states out of the maximum existing 64 states in the CSI-AperiodicTriggerStateList for a single DCI scheduling the super resource set consisting of an X (X>1) slot of CSI-RS resource sets. In this case, the CSI_request codepoint in DCI remains the same as legacy one.

Figure 4:
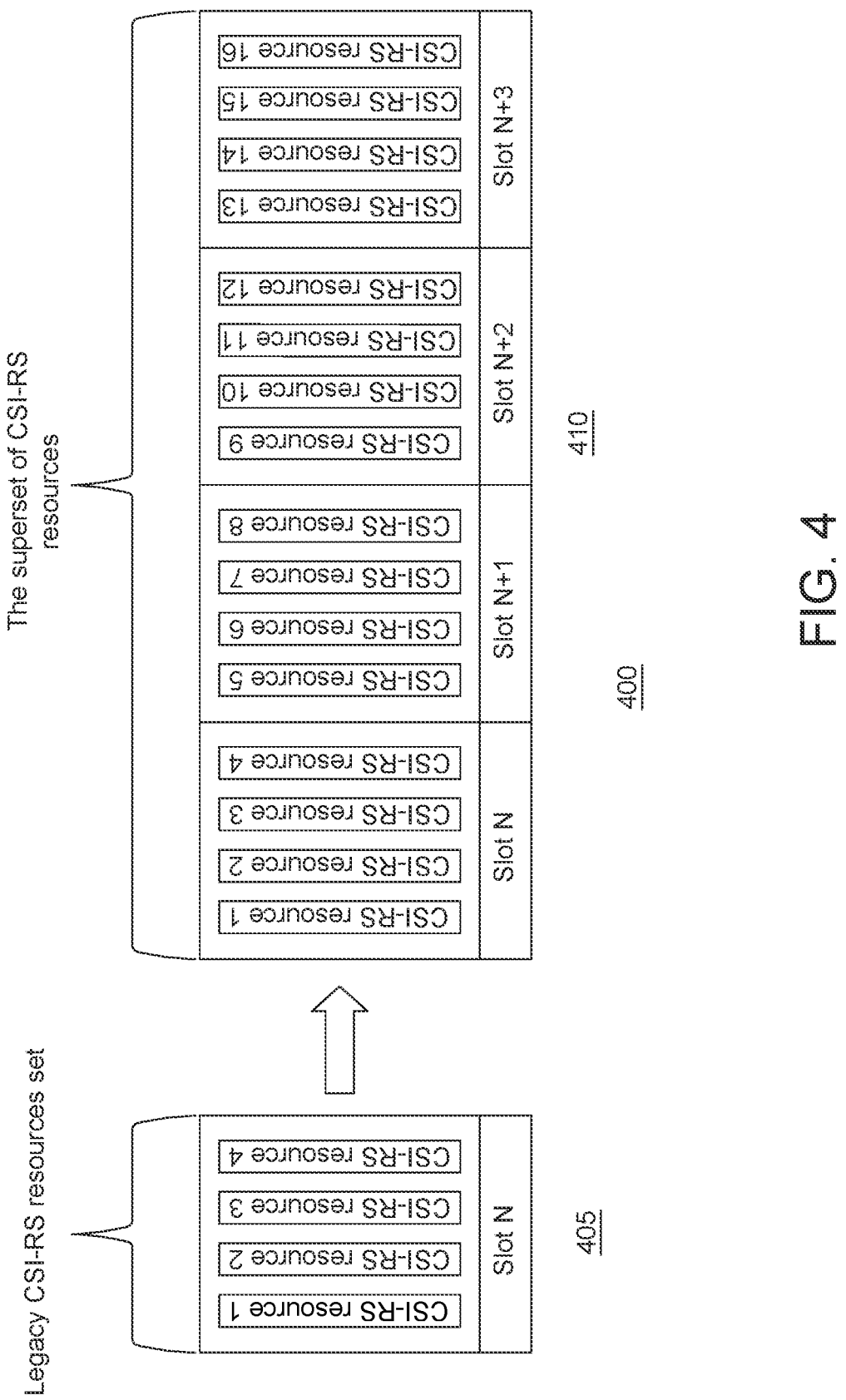
FIG. 4 illustrates a superset of CSI-RS resources, where the super resource set consists of 4 legacy resource sets, according to an embodiment.

FIG. 4 (400) illustrates superset of CSI-RS resources, where the super resource set consists of 4 legacy resource sets, according to an embodiment.

In Table C shown below, and referring to (405) in FIG. 4, the legacy CSI-ResourceConfig for single slot CSI-RS resources is shown. To support a single DC scheduling superset of CSI-RS resources, the legacy CSI-ResourceConfig is changed as shown in Table 2 and (410) in FIG. 4 That is, Table 2 shows the disclosed CSI-ResourceConfig for the superset of CSI-RS resources.

Specifically, the NZP-CSI-RS-ResourceSet List is changed to be a set of instances of ResourceSetIDs in a bracket composing the superset CSI-RS resource scheduled by single DCI, whereas a legacy instance is only a singleResourceSetID scheduled by a single DCI as in Table 1.

TABLE 1

| CSI-ResourceConfig | | |
|---|---|---|
| CSI-ResourceConfigID | 0-111(legacy) | |
| CSI-RS-ResourceSetList | NZP-CSI-RS-SSB | |
| | NZP-CSI-RS-ResourceSetList | SEQUENCE {ResourceSetID_1, ResourceSetID_2, ResourceSetID_3, ResourceSetID_2, . . . up to 16 instances} |
| BWP-ID | 0-4 | |
| resourceType | Aperodic | |

TABLE 2

| CSI-ResourceConfig | | |
|---|---|---|
| CSI-ResourceConfigID | 112-Y (New) | |
| CSI-RS-ResourceSetList | NZP-CSI-RS-SSB | |
| | NZP-CSI-RS-ResourceSetList | SEQUENCE {(ResourceSetID_1, ResourceSetID_2), (ResourceSetID_2, ResourceSetID_3), . . . up to 16 instances} |
| BWP-ID | 0-4 | |
| resourceType | Aperodic | |

In a 2$^{nd}$ solution, a sequence of integers indicates multiple resource sets comprising the super resource set in CSI-AssociatedReportConfigInfo, as shown below, instead of just having one integer as in the legacy CSI-AssociatedReportConfigInfo in the trigger state. Triggering DCI indicates the triggering state, which includes the set of ResourceSetIDs composing the superset resource which is RRC configured.

```
resourcesForChannel      CHOICE {
    nzp-CSI-RS           SEQUENCE {
        resourceSet1         INTEGER (1..maxNrofNZP-CSI-RS-
ResourceSetsPerConfig),
        resourceSet2         INTEGER (1..maxNrofNZP-CSI-RS-
ResourceSetsPerConfig),
        resourceSet3         INTEGER (1..maxNrofNZP-CSI-RS-
ResourceSetsPerConfig),
        ............................................................
        qcl-info1            SEQUENCE (SIZE(1..maxNrofAP-CSI-RS-ResourcesPerSet))
OF TCI-StateId,
        qcl-info2            SEQUENCE (SIZE(1..maxNrofAP-CSI-RS-ResourcesPerSet))
OF TCI-StateId,
        qcl-info3            SEQUENCE (SIZE(1..maxNrofAP-CSI-RS-ResourcesPerSet))
OF TCI-StateId,
        ............................................................
                             OPTIONAL -- Cond Aperiodic
    },
    csi-SSB-ResourceSet  INTEGER (1..maxNrofCSI-SSB-ResourceSetsPerConfig)
    },
    csi-IM-ResourcesForInterference   INTEGER(1..maxNrofCSI-IM-ResourceSetsPerConfig)
                             OPTIONAL, -- Cond CSI-IM-
ForInterference
    nzp-CSI-RS-ResourcesForInterference INTEGER (1..maxNrofNZP-CSI-RS-
ResourceSetsPerConfig)
                             OPTIONAL, -- Cond NZP-CSI-RS-
ForInterference
    ...
}
```

Alternatively, the single integer of "resourceSet" above can be replaced with multiple sequences of integers while each sequence corresponds to a DCI codepoint which is mapped to a unique set of CSI-RS resource sets composing the super resource set, where the mapping between a DCI codepoint and a unique set of CSI-RS resource sets is RRC pre-configured. In operation, a UE will skip (and/or a network may not include) the "resourceSet" indication in legacy trigger state, i.e., CSI-AssociatedReportConfigInfo. Instead, one of DCI codepoint configured in the RRC can dynamically indicate and trigger the set of CSI-RS resource sets which compose the scheduled CSI-RS super resource set. For example, the existing 6 bits can still indicate one trigger state, and an additional number of bits can indicate multiple resource sets within each trigger state. In particular, a set of CSI trigger states is reserved out of the maximum existing 64 states in CSI-AperiodicTriggerStateList for single DCI scheduling the super resource set consisting of X (X>1) slot of CSI-RS resource sets. The CSI_request codepoint in DCI is extended with a few bits indicating the set of ResourceSetIDs composing the superset resource scheduled by one piece of DCI, where the mapping between the additional bits and the set of ResourceSetIDs are RRC pre-configured as mentioned above. For example:

011 indicates {(ResourceSetID_1, ResourceSetID_2, ResourceSetID_2),
101 indicates {(ResourceSetID_2, ResourceSetID_3, ResourceSetID_4).

When UE receives the CSI_request codepoint in DCI indicating the set of reserved CSI trigger states for multi-slot CSI-RS scheduling, The UE will decode the additional bits in the DCI indicating the set of ResourceSetIDs composing the superset resource.

In a $3^{rd}$ solution, maintaining the legacy CSI_request codepoint in DCI for aperiodic CSI-RS triggering, the definition of NZP-CSI-RS-Resource is extended from a single slot resource to A multi-slot superset resource by shifting the legacy resource mapping in A time domain of slots. In particular, the legacy NZP-CSI-RS-Resource parameter configuration structure for supporting multi-slot superset resource is changed by adding the variables of slot Index in the superset and time offset to a $1^{st}$ slot of superset, as shown in Table 3 below. That is, Table 3 shows the disclosed NZP-CSI-RS-Resource parameter configuration structure for a superset resource.

Alternatively, the time offset can also be defined with respect to the slot over which triggering DCI is sent. Thus, every single CSI-RS resource also has the slot index in the defined superset resource as well as the time offset to the $1^{st}$ slot of the defined superset resource. The additional changes are as follows:

NZP-CSI-RS-ResourceID—increase the maximum ID to 64*(total number of slots in the defined superset resource).
TCI-StateID—increases the maximum TCI-StateID to (128*number of slots in the defined superset resource-1).

TABLE 3

| NZP-CSI-RS-Resource | |
|---|---|
| NZP-CSI-RS-ResourceID | 0-64 * (total number of slots) |
| ResourceMapping | Legacy fields in a single slot resource set |
| ............................................. | |
| ............................................. | |
| slot Index in the superset | 0-(total number of slots in superset) |
| time offset to $1^{st}$ slot of superset | X slots |

TABLE 3-continued

| NZP-CSI-RS-Resource | | |
|---|---|---|
| powerControlOffset | legacy | |
| scramblingID | legacy | |
| periodicityAndOffset | legacy | |
| Qcl-InfoPeriodicCSI-RS | TCI-StateID | 0-(128* number of slots − 1) |

Accordingly, and in view of Table 4 below which shows the disclosed NZP-CSI-RS-ResourceSet parameter configuration structure for the superset resource, the parameter structure used to configure an NZP CSI RS resource set can be enhanced to support a superset of CSI RS resources as follows:

nzp-CSI-ResourceSetID 0-63=>reserve a set of ResourceSetIDs for superset resource nzp-CSI-Resource Sequence $1-64 instances)=>increase the max number of instances to 64*number of slots in the superset resource

TABLE 4

| NZP-CSI-RS-ResourceSet | |
|---|---|
| nzp-CSI-ResourceSetID | 0-63, where a set of ResourceSetIDs are reserved for Superset of CSI-RS resources. |
| nzp-CSI-Resources | SEQUENCE {1-64 * total number of slots instances} |
| Repetition | on, off |
| AperiodicTriggeringOffset | 0-4 |
| Trs-Info | true |

In a 4th solution, the legacy procedures defined in the current specification are maintained, but a time-offset field is added in the definition of CSI-RS resource. The time offset for a CSI-RS resource is defined as the number of slots with respect to the triggering DCI. In other words, the current set of the CSI-RS resources defined within a single slot is maintained but is spread across multiple slots by adding a time offset to the triggering DCI. The $4^{th}$ solution solves a fundamental issue of the CSI-RS based beam training in the current specification, where a single panel UE can only receive one CSI-RS resource at a time and thus can only measure a very limited set of CSI-RS resources out of the total number of sent CSI-RS resources if all the CSI-RS resources are sent within one slot, as in the current specification. This procedure in the current specification is insufficient for beam management. By adding a time slot offset in each set of CSI-RS resources and spreading these sets over multiple slots, the UE can measure more CSI-RS resources out of the total sent CSI-RS resources and over a longer time interval, thereby improving the efficiency of the CSI-RS resources measurement.

When no beam correspondence is supported at the UE, the SRS based UL beam management shall be supported. In the current specification, for beam management purposes, only one SRS resource set can be configured per antenna panel, where the SRS resource set is defined within a slot. To accommodate beam management at NR 60 GHz, the multi-slot DCI triggered SRS transmissions can be supported. Similar to CSI-RS, the multi-slot DCI triggered SRS can be designed based on the following solutions.

In the $1^{st}$ solution, the legacy SRS resource set definition and SRS resource mappings defined for a single slot are re-used and the legacy SRS-Config IE for configuring the superset of SRS resources is changed to be triggered by a single piece of DCI instead of a single slot SRS resource set. A set of values of the SRS request codepoint in DCI can be reserved to schedule the multi-slot SRS resource set. In particular, one embodiment is to add a set of SRS resource super sets to the srs-ResourceSeToAddModList in the SRS.config IE as follows:

srs-ResourceSeiToAddWodList SEQUENCE ((SRS-ResourceSet1, SRS-ResourceSet2, SRS-ResourceSet3), (SRS-ResourceSet1, SRS-ResourceSet4, SRS-ResourceSet6), . . . (SRS-ResourceSet2, SRS-ResourceSet5, SRS-ResourceSet7), where the max number of super sets of SRS-ResourceSet is maxNrofSRS-ResourceSets.

In the $2^{nd}$ solution, the set of SRS ResourceSetIDs composing the SRS superset resource is indicated in the triggering DCI, instead of being configured in the SRS-Config 1E via the RRC. In particular, an additional number of bits can be added into the SRS request codepoint in the DCI to indicate the set of SRS single slot ResourceSetIDs composing SRS the superset resource scheduled by single DCI. For example:

011 indicates {(SRS-ResourceSetID_1, SRS-ResourceSetID_2, SRS-ResourceSetID_2), 101 indicates {(SRS-ResourceSetID_2, SRS-ResourceSetID_3, SRS-ResourceSetID_4).

When the UE receives the SRS_request codepoint in DCI indicating the set of reserved values for multi-slot SRS scheduling, the UE will decode the additional bits in DCI indicating the set of SRS ResourceSetIDs composing the SRS superset resource. In addition, the UE will skip the RRC configured srs-ResourceSetToAddModList in the SRS-Config IE.

In the $3^{rd}$ solution, the legacy SRS_request codepoint in the DCI for aperiodic SRS triggering is maintained, and the definition of SRS-Resource is extended from a single slot resource to a multi-slot superset resource. The resource mapping is extended from a single slot SRS resource to multiple slots by shifting the legacy resource mapping in a time domain of slots. In particular, the legacy SRS-Resource parameter configuration structure for supporting multi-slot superset resource is changed by adding the variables of slot Index in the superset and time offset to the $1^{st}$ slot of the superset. Thus, each SRS resource also has the slot index in the defined SRS superset resource as well as the time offset added to the $1^{st}$ slot of the defined SRS superset resource. Alternatively, the time offset can also be defined with respect to the slot over which the triggering DCI is sent. The additional changes are as follows:

SRS-ResourceID—increase the maximum ID to 64*(total number of slots in the defined SRS superset resource). Accordingly, the parameter structure used to configure an SRS resource set can be enhanced to support a superset of SRS resources as follows:

SRS-ResourceSetID 0-15=>reserve a set of SRS ResourceSetIDs for the SRS superset resource.

SRS-ResourceIDlist Sequence {1-16 instances}=>increase the max number of instances to 16*number of slots in the SRS superset resource.

In the 4th solution, the legacy procedures defined in the current specification are maintained, but a time-offset field is added in the definition of the SRS resource. The time offset for the SRS resource is defined as the number of slots with respect to the triggering DCI. In other words, the current set of the SRS resources defined within a single slot is maintained, but this set of SRS resources is spread across multiple slots by adding a time offset to the triggering DCI. The $4^{th}$ solution solves a fundamental issue of SRS based beam training in the current specification, where a single panel UE can only transmit one SRS resource at a time, and thus, can only send a very limited set of SRS resources out of the total number of sent SRS resources if all the SRS resources are defined within one slot. This procedure is insufficient for beam management. By adding a time slot offset in each set of SRS resources and spreading the set of resources over multiple slots, the UE can send more SRS resources out of the total defined SRS resources and over a longer time interval, thereby improving the efficiency of SRS resources-based beam training in the UL.

For periodic RS based beam management, the periodic and semi-persistent CSI-RS validation rule shall be enhanced at NR 60 GHz, considering the beam-based transmission. Specifically, a reference signal is validated (or determined as being valid) and is then transmitted by a base station after a successful LBT channel access is performed and it is transmitted within the indicated COT duration from the transmitter. As will be described in reference to FIGS. 5 and 6 below, a new DCI format referred to as DCI_New is provided as a GC-PDCCH used for notifying the slot format, COT duration, available resource block (RB) sets, and search space group switching, per directional beam or TCI state for the self-carrier. Herein, an RB set refers to continuous resource blocks that are used by the UE or Base Station as the LBT Bandwidth unit to perform channel access in the unlicensed spectrum.

In the carrier aggregation scenario, DCI_New can also be used for indications of the slot formats, COT durations, available RB sets, and search space group switching per directional beam of other carriers than the self-carrier as. The following information is transmitted by means of the DCI format DCI_New with a cyclic redundancy check (CRC) scrambled by slot format indication radio network temporary identifier (SFI-RNTI):

TCI state 1: Slot format indicator 1, Slot format indicator 2, . . . , Slot format indicator N.
TCI state 2: Slot format indicator 1, Slot format indicator 2, . . . , Slot format indicator N.
. . .
TCI state N: Slot format indicator 1, Slot format indicator 2, . . . , Slot format indicator N.
If the higher layer parameter availableRB-SetPerCell-r17 is configured,
TCI state 1: Available RB set Indicator 1, Available RB set Indicator 2, . . . , Available RB set Indicator N1.
TCI state 2: Available RB set Indicator 1, Available RB set Indicator 2, . . . , Available RB set Indicator N1,
. . .
TCI state N: Available RB set Indicator 1, Available RB set Indicator 2, . . . , Available RB set Indicator N1
If the higher layer parameter CO-DurationPerCell-r17 is configured,
TCI state 1: COT duration indicator 1, COT duration indicator 2, . . . , COT duration indicator N2.
TCI state 2: COT duration indicator 1, COT duration indicator 2, . . . , COT duration indicator N2.
. . .
TCI state N: Slot format indicator 1, Slot format indicator 2, . . . , Slot format indicator N.
If the higher layer parameter searchSpaceSwitchTrigger-r17 is configured,
TCI state 1: Monitoring group flag 1, Monitoring group flag 2, . . . , Monitoring group flag [M].
TCI state 2: Monitoring group flag 1, Monitoring group flag 2, . . . , Monitoring group flag [M].
. . .
TCI state N: Monitoring group flag 1, Monitoring group flag 2, . . . , Monitoring group flag [M].

The DCI_New provides the dynamic signaling/channel indicating the specific COT information per directional beam or TCI state, which can be considered as a guarantee of existence of all non-dynamic signals/channels per directional beam or TCI state without suffering from potential LBT failure. The DCI_New also provides the dynamic signaling/channel indicating the specific available RBs at each slot within the COT per directional beam or TCI state for transmission and reception. The DCI_New also provides the dynamic signaling/channel indicating the specific slot format of each slot within the COT per directional beam or TCI state. The DCI_New also provides the dynamic signaling/channel indicating of the switching point of two types of—UE PDCCH monitoring behaviors within the COT per directional beam or TCI state. NR-U links two PDCCH monitoring behaviors per TCI state. In the first behavior, a UE more frequently tries to decode a PDCCH such as to detect the start of a COT for a given TCI state. In the second behavior, once UE knows that it is inside a COT for that TCI state, the UE more infrequently tries to decode the PDCCH for that TCI state.

Once a UE decodes the DCI_New for a directional beam or TCI state and identifies that it is within the COT for that TCI state, the UE may initialize the UL transmission as the UL transmission for that TCI state in a licensed spectrum without performing directional LBT.

Once a UE decodes the DCI_New for a directional beam or TCI state, the UE can consider there to be a guarantee of existence of the reference signals (e.g., DRS\SSB\CSI-RS etc.) within the COT for that TCI state.

Alternatively, for each TCI state or directional beam, a dedicated DCI_New can be introduced, with the following content with a CRC scrambled by SFI-RNTI.

TCI state i: Slot format indicator 1, Slot format indicator 2, . . . , Slot format indicator N.
If the higher layer parameter availableRB-SetPerCell-r17 is configured,
TCI state i: Available RB set Indicator 1, Available RB set Indicator 2, . . . , Available RB set Indicator N1.
If the higher layer parameter CO-DurationPerCell-r17 is configured,
TCI state i: COT duration indicator 1, COT duration indicator 2, . . . , COT duration indicator N2.

If the higher layer parameter searchSpaceSwitchTrigger-r17 is configured,
TCI state i: Monitoring group flag 1, Monitoring group flag 2, ..., Monitoring group flag [M].

Additionally, if regulation allows some LBT free transmissions of minimal control signaling in the LBT transmission mode, and if the transmitted reference signals are outside the indicated COT duration from the DCI_New but within the LBT free duration indicated by the DCI_New for a given TCI state, the UE can also consider there to be a guarantee of existence of such reference signals. That is, the reference signals are indicated to the UE as being extant. The LBT free minimal (or small) control signaling can reduce the LBT overhead during the beam management process. The DCI_New indicates the starting time position and duration of the LBT free CSI-RS transmissions to the receiving UE. Alternatively, the starting time position and duration of the LBT free CSI-RS transmissions can be pre-configured and periodically repeated over time, e.g., LBT free CSI-RS transmissions can be pre-configured in the discovery reference signal window, time division multiplexed (TDMed) with the SSB burst.

When DCI_New contains a COT duration but does not contain SFI for a given TCI state or directional beam, the UE cancels the reception of the set of periodic or semi-persistent CSI-RS that corresponds to that TCI state configured by higher layers on the downlink and flexible symbols (including when no semi-static time division duplex (TDD) configuration is provided to the UE) if the set of periodic or semi-persistent CSI-RS locations that correspond to that TCI state is outside the COT duration indicated by the COT duration field for that TCI state.

A new RRC parameter is provided, which can be used to determine reception/cancellation behavior for a CSI-RS configured by higher layers for when reception of DCI_New for a given TCI state is not configured to the UE, and reception of DCI_New for a given TCI state is configured to the UE but both SFI and COT-duration for that given TCI state are not configured.

This new RRC parameter is used to determine the UE behavior at least when the UE is not configured with the COT-duration and is not configured with SFI for a given TCI state. For example, if the RRC parameter is configured, when the UE is configured by higher layers to receive periodic and semi-persistent CSI-RS in a set of symbols in a slot for a given TCI state, the UE cancels the higher-layer configured periodic and semi-persistent CSI-RS reception in the set of symbols in the slot for that given TCI state when the UE does not detect a DCI format for a given TCI state indicating to the UE to receive aperiodic CSI-RS or PDSCH in the set of symbols for that given TCI state.

Furthermore, if the parameter is not configured, the UE cancels/receives the higher-layer configured periodic and semi-persistent CSI-RS reception for that given TCI state according to clause 11.1 of TS 38.213.

If at least one of SFI and COT duration fields in the DCI_New for a given TCI state is configured, the UE may average measurements of two or more instances of a periodic or semi-persistent NZP CSI-RS for that given TCI state for channel measurement or for interference measurement that occur in the indicated remaining COT duration for that given TCI state. The UE shall not average measurements of two or more instances of a periodic or semi-persistent NZP CSI-RS for that TCI state for channel measurement or for interference measurement that do not occur in the indicated remaining COT duration for that TCI state.

If neither SFI nor COT duration fields in the DCI_New for a given TCI state are configured but CSI-RS-Validation-With-DCI-r17 is configured, the UE may average measurements of two or more instances of a periodic or semi-persistent NZP CSI-RS for that given TCI state for channel measurement or for interference measurement that occur in a time duration for which all OFDM symbols are occupied by a set of PDSCH and/or CSI-RSs for that given TCI state that are scheduled/triggered to the UE (including the scheduling/triggering PDCCHs). The UE shall not average measurements of two or more instances of a periodic or semi-persistent NZP CSI-RS for that given TCI state for channel measurement or for interference measurement that occur in a time duration for which less than all OFDM symbols are occupied by a set of PDSCH and/or CSI-RS(s) for that given TCI state scheduled/triggered to the UE, including the scheduling/triggering PDCCH(s).

If a UE is configured by higher layers to receive a CSI-RS for a given TCI state or detects a DCI format 0_1 indicating to the UE to receive a CSI-RS for a given TCI state in one or more RB sets and a set of symbols of a slot, and the UE detects a DCI_New with a bitmap indicating that any RB set from the one or more RB sets is not available for reception, the UE cancels the CSI-RS reception for that given TCI state in the set of symbols of the slot.

In legacy beam management procedures, the following DL L1/L2 procedures are supported within one or multiple TRPs:
P-1 is used to enable UE measurement on different TRP transmission (Tx) beams to support selection of TRP Tx beams/UE Rx beam(s)
Beamforming at TRP typically includes an intra/inter-TRP Tx beam sweep from a set of different beams. For beamforming at a UE, a UE receive (Rx) beam sweep is typically received from a set of different beams.
P-2 is used to enable UE measurement on different TRP Tx beams to possibly change inter/intra-TRP Tx beam (s) from a possibly smaller set of beams for beam refinement than in P-1. Note that P-2 can be a special case of P-1.
P-3 is used to enable UE measurement on the same TRP Tx beam to change a UE Rx beam when the UE uses beamforming.

P-1 is based on UE SSB beam detection. In NR-U Rel-16, discovery reference signal (DRS) is introduced. To accommodate the transmission failure of SS/PBCH blocks due to a channel access procedure in an unlicensed spectrum, the number of candidate SS/PBCH block locations within a DRS transmission window is increased to 10 and 20 for SCS=15 kilohertz (kHz) and SCS=30 kHz, respectively. A similar approach can be taken for P-1 in NR-U 60 GHz, in that the number of candidate SS/PBCH block locations within a DRS transmission window can be increased to larger than 64 SSB beams. That is, the repetition of 64 unique SSB beams can be implemented within a DRS transmission window to accommodate the LBT failure. However, the COT acquisition in NR-U 60 GHz can be different than NR-U Rel-16 in 60 GHz, due to the beam-based transmission of SSB beams. The following apply for COT acquisition of the DRS:

In Option 1, the gNB performs quasi-omni-directional LBT before the transmissions of SSBs to acquire the COT duration equal to the DRS window size for the transmitting various SSB beams with various QCL relations. In particular, the gNB performs LBT using at least one broad beam with which each of a subset of SSB beams transmitted in the COT is QCL'ed. In addition, the gNB performs the LBT with the broad beam by using a lower energy detection threshold than the detection threshold used in a narrow beam (such as the beam width of the SSB beam) energy detection such that each of the subset of SSB beams within the COT is a child beam of that broad beam. The gNB may perform multiple instances of LBT using multiple broad beams in a time division multiplexing manner before the SSB transmissions, in order to cover all the subset of SSB beams transmitted within the COT, where each of the subset of SSB beams within the COT is a child beam of one of the broad beams.

In Option 2, the gNB performs a set of directional LBT using the different directional beams simultaneously or in a time division multiplexing manner before SSB beam transmissions in the DRS window. Each of the unique TCI states of the set of directional beams corresponds to each of the unique TCI states of the set of SSB beams within the DRS window. Each LBT directional beam is QCL'ed with at least one transmitted SSB beam. Once the directional LBT using a particular directional beam is successful, the gNB acquires the COT for the SSB beams in the DRS window which are QCL'ed with that particular directional beam.

In Option 3, if regulation allows, the SSB beam transmissions in the DRS window can be LBT free e.g., up to 10% LBT free short control signaling within observation window of 100 ms in LBT-mandatory transmission mode. In this case, the legacy SSB detection schemes in NR can apply, despite the fact that the UE shall be RRC pre-configured with the frequency, time position and periodicity of the DRS window.

As to P-2 and P-3, once the UE identifies a good SSB beam toward the gNB, the UE performs beam refinement to further identify a narrow beam within the good SSB beam. Either periodical or aperiodic CSI-RS can be used for beam refinement in P-2 and P-3. In the case of periodical CSI-RS, a new DCI format other than legacy DCI 2_0 is introduced for validating CSI-RS signals for beam refinement. In addition to the information contained in legacy DCI 2_0, this new DCI format includes the COT duration information per sub-band information per beam information in the form of the TCI state, where the beam is used by the gNB to perform directional LBT for acquiring a COT for that CSI-RS beam/TCI state. This new DCI can also indicate the frequency, time position and durations of the CSI-RS signals outside the COT duration but are LBT free e.g., up to 10% LBT free short control signaling within observation window of 100 ms in LBT-mandatory transmission mode.

Figure 5:
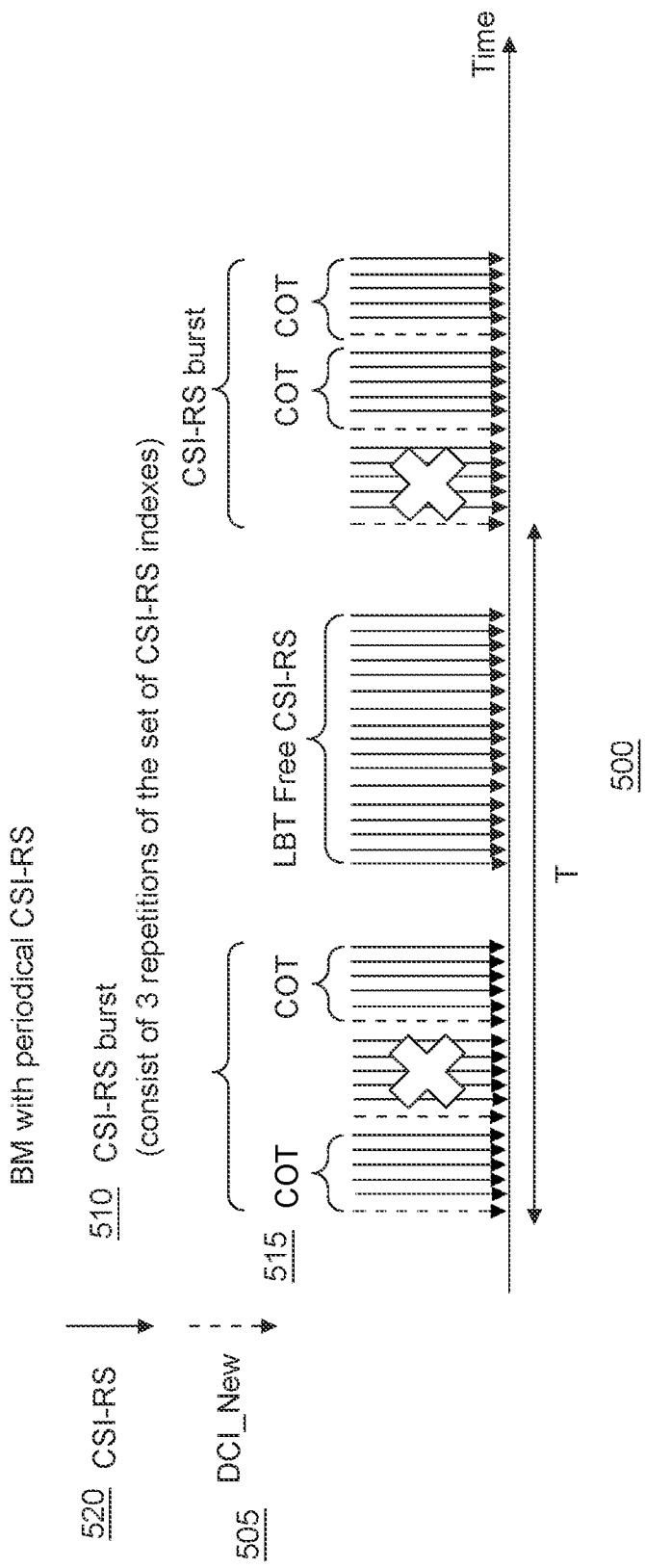
FIG. 5 illustrates a periodic CSI-RS for beam refinement, according to an embodiment.

FIG. 5 illustrates a periodical CSI-RS (500) for beam refinement, according to an embodiment. As shown in FIG. 5, the set of CSI-RS indices, which are all QCL'ed with the selected good SSB beam by the UE are transmitted in time domain repetitions, defined as one CSI-RS burst (510). The CSI-RS burst (510) is transmitted periodically every T ms.

In case the time duration of one CSI-RS burst (510) is less than or equal to the COT duration, in option 1, the gNB performs one directional LBT before the CSI-RS transmissions (520) with the directional beam which is QCL'ed with the identified good SSB beam and has the same beam width as that SSB beam i.e., the sensing beam is identical to the SBB beam. Assuming the same receiver antenna gain is constant, the energy detection threshold in this case is lower than the one used in narrower beam sensing (such as when the beam width is identical to the CSI-RS resource transmission (520)), such that each CSI-RS resource transmission beam is a child beam of this directional sensing beam. Once LBT is successful and DCI_New (505) is received, the UE starts to receive CSI-RS indices from the entire CSI-RS burst in the COT duration (515).

In option 2, the gNB performs a set of directional LBT with the directional beams simultaneously in the spatial domain or sequentially in the time domain before the CSI-RS transmissions, each of which is QCL'ed with at least one CSI-RS index and the sensing beam is identical to at least one CSI-RS transmission beam. Each of the unique TCI states of the set of directional beams corresponds to each of the unique TCI states of the set of CSI-RS indices within the CSI-RS burst. Once LBT with a particular directional beam is successful, the UE starts to receive CSI-RS indices from the CSI-RS burst in the COT duration for the TCI state of the LBT sensing beam. In Option 1 and Option 2, DCI_New can also indicate the frequency, time positions for additional CSI-RS transmissions (520) outside of COT duration but LBT free for up to 10% control signaling in the 100 ms time observation window.

When the time duration of one CSI-RS burst (510) is larger than the COT duration (515), as shown in FIG. 5, there are multiple time occasions in one CSI-RS burst (510) for the UE to receive DCI_New (505) and acquire a COT (515) for receiving CSI-RS indices.

In one instance, the gNB performs one directional LBT before each candidate time occasion to receive DCI_New with the directional beam which is QCL'ed with the identified good SSB beam and has the same beam width as the SSB beam. Assuming the same receiver antenna gain is constant, the energy detection threshold in this case is lower than the threshold used in narrower beam detection (such as the beam width of CSI-RS being identical to that of the CSI-RS resource transmission), such that each CSI-RS resource transmission beam is a child beam of this directional sensing beam. Once LBT is successful, the UE starts to receive the DCI_New from the gNB, where the DCI_New indicates the COT duration for this directional beam used for LBT. This directional beam can be represented by the corresponding SSB beam index. The COT duration can be represented by SFI or a specific COT duration field in DCI_New.

In another instance, the gNB performs a set of directional LBT with the directional beams simultaneously in the spatial domain or sequentially in the time domain before each candidate time occasion to receive DCI_New, where each beam is QCL'ed with at least one CSI-RS index and the sensing beam has an identical width as at least one CSI-RS transmission beam. Each of the unique TCI states of the set of directional beams corresponds to each of the unique TCI states of the set of CSI-RS indices within the CSI-RS burst. Once LBT with a particular directional beam is successful, the UE start to receive the DCI_New for that directional beam, where the DCI_New includes the SFI information or COT information for that particular directional beam. Then UE starts to receive the CSI-RS indices in the COT duration for the TCI state of the LBT sensing beam. The UE may receive multiple DCI_New transmissions, each of which has unique COT duration information and corresponds to a particular LBT sensing beam used in the directional LBT.

Alternatively, UE may receive only one DCI_New which contains a set of COT durations that corresponds to the set of cleared LBT sensing beams after a set of successful directional LBT is received. The COT duration information can be represented by SFI or specific COT duration field in the DCI_New transmission. A directional beam can be represented by a unique TCI state including the RS type in the DCI_New transmission. The RS types can be either CSI-RS or SSB.

For aperiodic CSI-RS, the CSI-RS validation is implicitly indicated by the scheduling DCI which is denoted as DCI_New2 which supports the multi-slot CSI-RS scheduling disclosed earlier. In addition to the fields disclosed before for the DCI scheduling multi-slot aperiodic CSI-RS, DCI_New2 may also include the frequency and time resources of the LBT free aperiodic CSI-RS resource indices.

Figure 6:
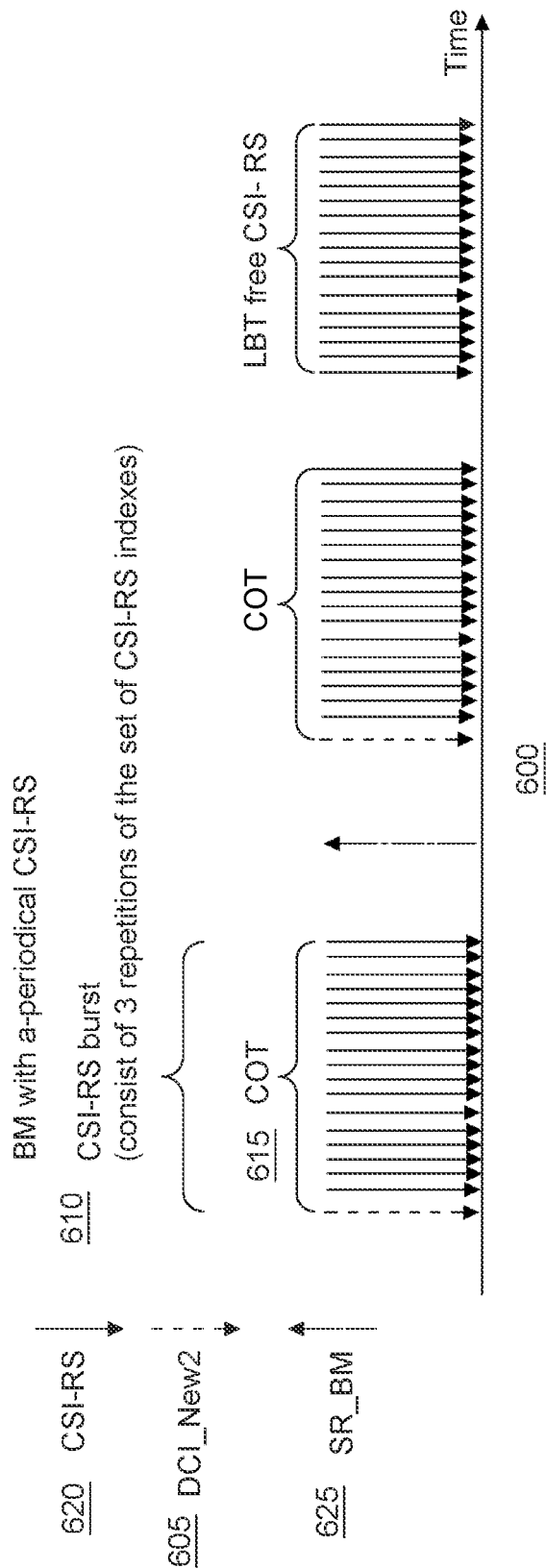
FIG. 6 illustrates an aperiodic CSI-RS for beam refinement, according to an embodiment.

FIG. 6 illustrates an aperiodic CSI-RS for beam refinement, according to an embodiment. As shown in FIG. 6, by receiving the DCI_New2 (605), the implicit CSI-RS validation is performed at the UE. The COT (615) acquisition methods for aperiodic CSI-RS are identical to those used for periodical CSI-RS as described in reference to FIG. 5.

If a UE detects insufficient CSI-RS (620) samples for beam refinement due to the LBT failures after the current CSI-RS burst (610), the UE can request to the gNB for additional aperiodic CSI-RS bursts via UL signaling e.g., a special SR (SR_BM) (625): A special scheduling request is defined using specific PUCCH resource for requesting a beam management (BM) CSI-RS burst. The SR_BM (625) is sent in the PUCCH to a gNB with the same QCL relation information as when the UE detected a good SSB beam. Alternatively, the UE can request to gNB for more aperiodic CSI-RS bursts including the new field of this request in the existing aperiodic CSI-RS report signaling in the PUSCH.

There are several possible solutions for the BFR procedures in NR-U 60 GHz.

In the $1^{st}$ solution, the legacy BFR procedure is re-sued as frequently as possible, based on periodical CSI-RS signals. To handle the uncertainty of CSI-RS transmissions due to the LBT in unlicensed band, no explicit validation of periodical CSI-RS is assumed, and it is up to a UE to detect existence of CSI-RS transmissions at least for beam management CSI-RS transmissions. With added UE complexity, a UE can differentiate LBT failure (no existence) and beam failure (weak signal). In one embodiment, in addition to the legacy beam failure detection threshold Q_out2, the network can configure UEs with another threshold Q_out1, with Q_out1<Q_out2 for measuring RSRP values of periodic CSI-RS. When measured RSRP value>Q_out2, the beam is good. When Q_out1<measured RSRP value<Q_out2, the beam fails. When measured 0<=RSRP value<Q_out1, there is LBT failure of CSI-RS transmission or the gNB was unable to transmit CSI-RS in due time, thus the UE discontinues counting this CSI-RS transmission for the BFR process. When LBT is not mandatory by the regulation, some UEs can be configured in LBT mode whereas others can be configured in No-LBT mode. Thus, the network only configures Q_out1 and Q_out2 to those UEs in LBT mode via system information. Alternatively, the network pre-configures Q_out1 and Q_out2 to all UEs in the cell via system information and network activates the usage of it via MAC CE or DCI to individual UE which is configured to LBT mode. The network may also pre-configures Q_out1 and Q_out2 to all UEs in the cell via system information while the UE autonomously activates the usage of both Q_out1 and Q_out2 in the BFR e.g., when the UE is configured in LBT mode and estimates the LBT failures rather than beam failures based on the typical patterns of detected CSI-RS transmissions.

In the $2^{nd}$ solution, the BFR procedures in NR-U 60 GHz are as follows:

For each serving cell, UE is RRC configured with a set q_0 and a set q_1 respectively of periodic CSI-RS or other RS resource configuration indices including their frequency and time resources, the number of repetitions in time, and periodicity. Alternatively, the UE can also be configured using aperiodic CSI-RS indices consisting of a set q_0 and q_1 and triggered by DCI_New2 (aperiodic CSI-RS triggering DCI).

The q_0 set of periodic CSI-RS indices are validated in the same manner via DCI_New (GC-DCI) as the periodic CSI-RS indices used for beam refinement. The UE simultaneously monitors the set of CORESETs (i.e., aggregation of control channel elements (CCEs)) which are QCL'ed with a subset of CSI-RS indices in the set q_0 to receive one DCI_New transmission which contains the COT durations of all the cleared CSI-RS beams after a set of successful directional LBTs with the LBT sensing beam matches the CSI-RS transmission beam, or with one or multiple successful direction LBTs with the LBT sensing beams covering all the CSI-RS transmission beams, or receive multiple DCI_New transmissions containing the COT duration of the cleared CSI-RS beam after a successful directional LBT with the LBT sensing beam is identical in width to the CSI-RS transmission beam.

For aperiodic CSI-RS of set q_0, the UE simultaneously monitors the set of CORESETs which are QCL'ed with a subset of CSI-RS indices in the set q_0 to receive one or multiple DCI_New2 transmissions which contain the same fields as the above-introduced DCI_New transmission.

Under beam failure, the UE may not be able to receive any DCI_New or DCI_New2 over the entire set q_0, and thus, will not be able to perform beam failure detection. Thus, in addition to the set q_0, the UE also needs to simultaneously monitor the set of CORESETs which are QCL'ed with the set of CSI-RS indices in the set q_1 to receive at least one DCI_New or DCI_New2 for beam failure detection over set q_0, if at least one of the beams in the set q_1 is good. Alternatively, if set q_0 CSI-RS indices are transmitted in DRS window e.g., time multiplexed with SSB, then validation of q_0 CSI-RS indices may not be needed, since the COT acquisition has already been performed for various SSB beams which are the parent beams of the q_0 CSI_RS indices. Thus, the legacy beam failure detection procedure can apply.

Figure 7:
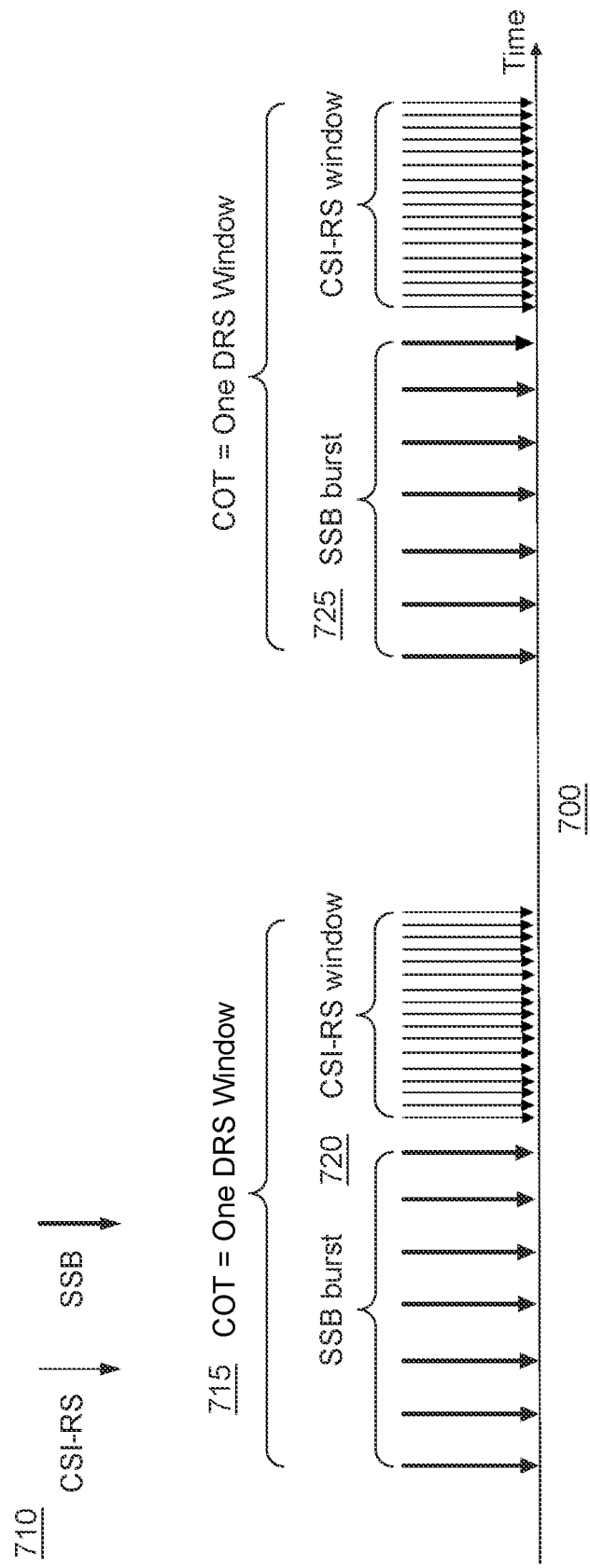
FIG. 7 illustrates a CSI-RS transmitted within a DRS window, according to an embodiment.

FIG. 7 illustrates a CSI-RS transmitted within a DRS window, according to an embodiment. That is, FIG. 7 illustrates an example of CSI-RS (710) transmitted within a DRS window (715) collocating with an SSB burst. Within the DRS window (715), there are pre-defined time durations of a CSI-RS window (720) for transmitting CSI-RS indices.

For CSI-RS indices in q_0 received within the acquired COT or within the DRS window (715), the UE assessed the radio link quality according to a set q_0 of resource configurations against the threshold Q_out_LR.

The physical layer informs the higher layers when the radio link qualities from every CSI-RS (710) in the set q_0 are less than the threshold Q_out_LR. The UE reports a beam failure indication to the higher layer.

For each beam failure indication from the lower layer (PHY), a beamFailureDetectionTimer will be (re)started, and a BFI_COUNTER will be increased by 1. The beamFailureDetectionTimer frozen when the current COT finishes. The beamFailureDetectionTimer resumes when the UE starts to receive the LBT free CSI-RS transmissions or when the UE receives the next DCI_New or DCI_New2 (or a DCI_New3 used for cross-carrier CSI-RS validation of CSI-RS transmissions from q_1, as described below in reference to FIG. 8) i.e., the next COT is acquired successfully via LBT. The beamFailureDetectionTimer is also frozen when the current CSI-RS burst finishes (in case the COT duration is larger than the CSI-RS burst duration) and resumes when it receives DCI_New or DCI_New2 or DCI_New3 in the next CSI-RS burst. Alternatively, in case q_0 CSI-RS indices are transmitted within DRS window, the beamFailureDetectionTimer is frozen when the current CSI-RS window in DRS window finishes and resumes when the new CSI-RS window starts in the next DRS window.

For the PCell or the PSCell, upon request from higher layers, the UE provides to higher layers the periodic or aperiodic CSI-RS configuration indices from the set q_1 and the corresponding L1-RSRP measurements that are greater than or equal to the $Q_{in,LR}$ threshold. In one embodiment, q_1 can be evaluated by measuring the existing SSB beams in DRS window which are QCL'ed with the CSI-RS indices in q_1, without transmitting and evaluating q_1 set of CSI-RS signal explicitly. In another embodiment, the q_1 set of CSI-RS can be transmitted in the DRS window as in FIG. 7, then a q_1 set of CSI-RS can be evaluated without explicit validation. In another embodiment, the q_1 set of CSI-RS indices can be transmitted as a periodic signal or an aperiodic signal with the DCI_New or DCI_New2 or DCI_New3 as the validation mechanisms similar to the CSI-RS transmissions from q_0 above, as in the case of the beam management procedure. The UE should simultaneously monitor the set of CORESETs, which are QCL'ed with the set of CSI-RS indices in the set q_1 to receive DCI_New for validation of periodic CSI-RS signals. In another embodiment, the q_1 set of CSI-RS indices can be transmitted as an aperiodic signal with DCI_New2, as in the above-described beam management procedure. The UE should simultaneously monitor the set of CORESETs which are QCL'ed with the set of CSI-RS indices in the set q_1 to receive DCI_New2, without explicit validation of CSI-RS.

Figure 8:
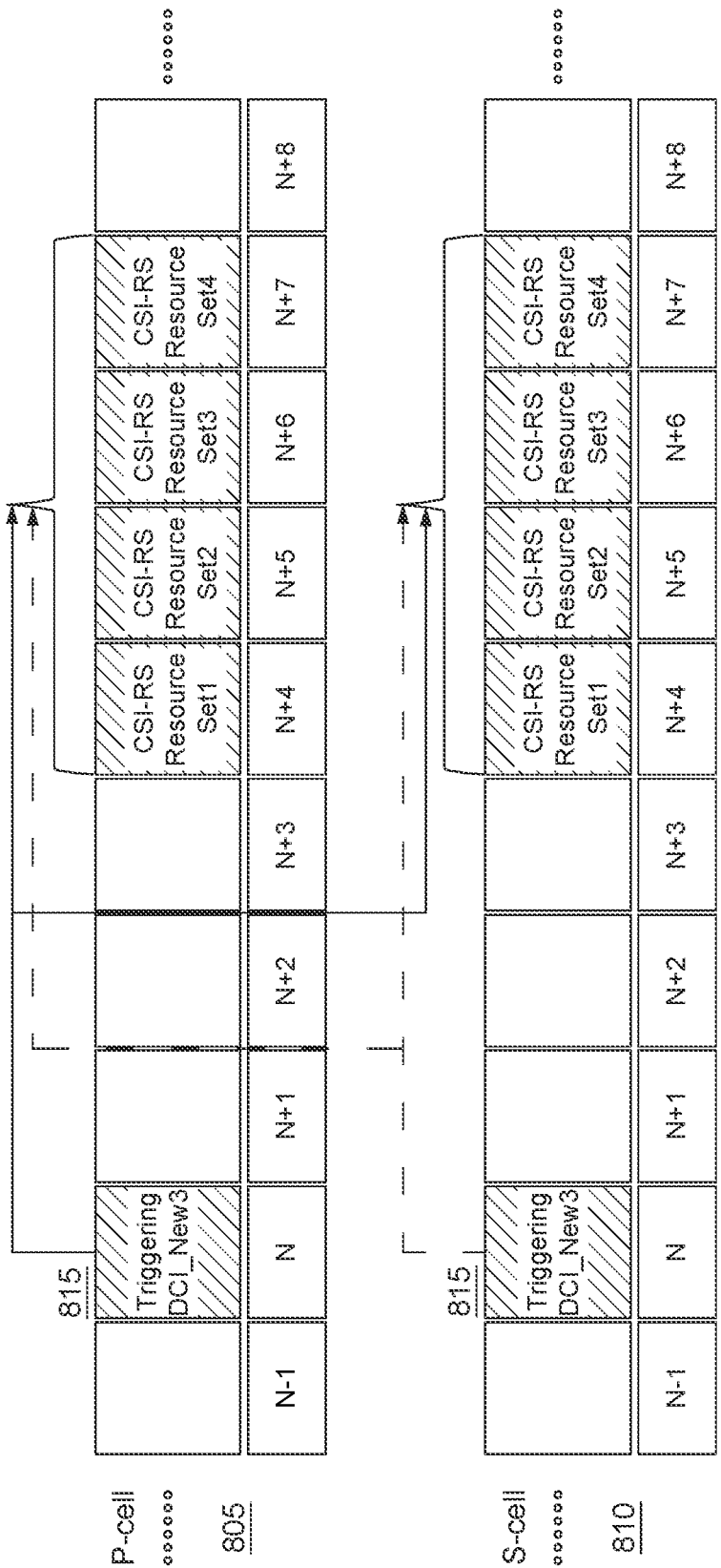
FIG. 8 illustrates cross-carrier aperiodic CSI-RS triggering, according to an embodiment.

FIG. 8 illustrates cross-carrier aperiodic CSI-RS triggering, according to an embodiment. In FIG. 8, DCI_New3 (815) can be used for cross-carrier CSI-RS validation of CSI-RS transmissions from q_1.

For the SCell (810), upon request from higher layers, the UE indicates to higher layers whether there is at least one periodic or aperiodic CSI-RS configuration index and/or SS/PBCH block index from the set q_1 with corresponding L1-RSRP measurements that are greater than or equal to the $Q_{in,LR}$ threshold, and provides the periodic and aperiodic CSI-RS configuration indices and/or SS/PBCH block indices from the set q_1 and the corresponding L1-RSRP measurements that are greater than or equal to the $Q_{in,LR}$ threshold, if any.

Before beamFailureDetectionTimer expires, if BFI_COUNTER>=beamFailureInstanceMaxCount, there is initiated a random access procedure on the SpCell or BFR on the Scell (810). In particular, the UE selects a new beam CSI-RS index defined as q_new from set q_1 and performs recovery procedure either CFBR or CBBR, similar to the legacy BFR procedure in NR Rel-15.

In the case of contention free beam recovery (CFBR), for the PCell or the primary secondary cell (PSCell), the UE can be provided, by PRACH-ResourceDedicatedBFR, a configuration for PRACH transmission. Upon performing LBT successfully, the UE starts PRACH transmission. For PRACH transmission in slot n and according to antenna port quasi colocation parameters associated with periodic CSI-RS resource configuration or with SS/PBCH block associated with index q_new provided by higher layers, the UE monitors PDCCH in a search space set provided by recoverySearchSpaceId for detection of a DCI format with CRC scrambled by C-RNTI or MCS-C-RNTI starting from slot n+K within a window configured by BeamFailureRecoveryConfig, where K is pre-defined for a given SCS and UE capability. For PDCCH monitoring in a search space set provided by recoverySearchSpaceId and for corresponding PDSCH reception, the UE assumes the same antenna port quasi-collocation parameters as those associated with index q_new until the UE receives, by higher layers, an activation for a TCI state or any of the parameters tci-StatesPDCCH-ToAddList and/or tci-StatesPDCCH-ToReleaseList. After the UE detects a DCI format with CRC scrambled by C-RNTI or MCS-C-RNTI in the search space set provided by recoverySearchSpaceId, the UE continues to monitor PDCCH candidates in the search space set provided by recoverySearchSpaceId until the UE receives a MAC CE activation command for a TCI state or tci-StatesPDCCH-ToAddList and/or tci-StatesPDCCH-ToReleaseList.

For the PCell (805) or the PSCell, after X symbols (where X depends on the number of used SCS) from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo, or is provided PUCCH-SpatialRelationInfo for PUCCH resource(s), the UE transmits a PUCCH on a same cell as the PRACH transmission using a same spatial filter as for the last PRACH transmission, or a power determined as described in TS 38.213 Clause 7.2.1 with $q_u=0$, $q_d=q_{new}$, and t=0

For the PCell or the PSCell, after X symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index q_new for PDCCH monitoring in a CORESET with index 0.

A UE can be provided, by schedulingRequestID-BFR-SCell-r16, a configuration for PUCCH transmission with a link recovery request (LRR) as described in TS 38.213 Clause 9.2.4. Upon successful LBT at UE, the UE can transmit in a first PUSCH MAC CE providing index(es) for at least corresponding SCell(s) (810) with radio link quality worse than $Q_{out,LR}$, indication(s) of presence of q_new for corresponding SCell(s) (810), and index(es) q_new for a periodic or aperiodic CSI-RS configuration or for a SS/PBCH block provided by higher layers, if any, for corresponding SCell(s) (810). After X symbols from a last symbol of a PDCCH reception with a DCI format scheduling a PUSCH transmission with a same HARQ process number as for the transmission of the first PUSCH and having a toggled NDI field value, the UE monitors PDCCH in all CORESETs on the SCell(s) indicated by the MAC CE using the same antenna port quasi colocation parameters as the ones associated with the corresponding index(es) $q_{new}$, if any, and transmits PUCCH on a PUCCH-SCell using a same spatial domain filter as the one corresponding to q_new for periodic or aperodic CSI-RS or SS/PBCH block reception, and using a power determined as described in TS 38.213 Clause 7.2.1 with $q_u=0$, $q_d=q_{new}$, and l=0, if the UE is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC-CE.

In the foregoing, the SCS configuration for the X symbols is the smallest of the SCS configurations of the active DL BWP for the PDCCH reception and of the active DL BWP(s) of the at least one SCell.

In an extreme case, during BFR, a UE cannot receive q0 DCI_New or DCI_New2, and if all q1 beams fail, a UE cannot receive q1 DCI_New or DCI_New2 either and cannot know if UE is in beam failure or not. So, in this extreme case, there is no way in which a UE realizes beam failure, thus neither beam recovery for PCell or PSCell nor beam failure indication for SCell is possible. Both are still possible (beam recovery in Pcell or PSCell by CBRA and beam failure indication for SCell) if a UE somehow realizes the beam failure. As one solution, when UE does not receive any CSI-RS either from q0 or q1 beams until a T timer expires, the UE assumes both q0 and q1 beams fail, and UE either start performing BFR using SSB in the DRS windows or indicates SCell beam failure using MAC CE. In addition, there can also be CSI-RS transmissions in DRS window, which can be used for further narrow beam refinement in this extreme case.

In the $2^{nd}$ solution, the DCI_New or DCI_New2 DCIs sent over q0 beams should either validate periodic CSI-RS signals that corresponds to q0 and q1 beams or trigger aperiodic CSI-RS signals that corresponds to q0 and q1 beams. Likewise, the DCI_New or DCI_New2 DCIs sent over q1 beams should either validate periodic CSI-RS signals that correspond to q0 and q1 beams or trigger aperiodic CSI-RS signals that correspond to q0 and q1 beams. The network can smartly minimize the overhead and send DCIs only over all good beams in q0 and q1 by estimating or predicting the potential good beams in q0 and q1 based on the UE reporting the most recent good beams to network periodically via existing active beam between the UE and network. When beam failure over q0 occurs, the UE cannot report the current good beams in q0 and q1 to the network. However, the network can predict the good beams in q0 and q1 based on recent data from UE reporting and machine learning algorithms. The UE complexity of simultaneously monitoring all the CORESET TCI States corresponding to all the beams in q0 and q1 will be reduced whenever possible.

In the 3rd solution, the complexity from the UE side is reduced. As with the 2nd solution, the network sends the triggering DCI DCI_New2 or validating DCI DCI_New in repetitions over all or a subset of beams in q0 and q1 respectively. The UE initially only monitors the CORESET TCI states corresponding to all the q1 beams in order to minimize the UE reception complexity of simultaneously monitoring CORESET TCI states corresponding to both q0 and q1. When the UE cannot receive validating or triggering DCIs from any q1 beams for a timer K, the UE assumes all q1 beams fail. Then the UE's BFR procedure returns to the 2nd solution where the UE monitors CORESET TCI states corresponding to both q0 and q1 beams. The remaining procedures are the same as in solution 2. Before the UE returns to solution 2, the procedure of the 3rd solution is the following: The q_0 and q_1 set of periodic CSI-RS indices are validated in the same way via DCI_New (GC-DCI) as the periodic CSI-RS indices used for beam refinement as before. The UE simultaneously monitors the set of CORESETs which are QCL'ed with a subset of CSI-RS indices in the set q_1 to receive one DCI_New duplicated in each CORESET which contains the COT durations of all the cleared CSI-RS beams in both q_0 and q_1 after a set of successful directional LBT with the LBT sensing beam matches the CSI-RS transmission beam, or with one or multiple successful direction LBT with the LBT sensing beams covers all the CSI-RS transmission beams in both q_0 and q_1, or receive multiple different DCI_New's, each of which containing a COT duration of a cleared CSI-RS beam in q_1 after a successful directional LBT with the LBT sensing beam matching the CSI-RS transmission beam in q_1 plus the COT duration information of all the cleared beam in q_0.

For aperiodic CSI-RS of set q_0 and q_1, the UE simultaneously monitors the set of CORESETs which are QCL'ed with the CSI-RS indices in the set q_1 to receive one or multiple triggering DCI_New2 which contains the same fields as DCI_New described above.

In the 4th solution, if the UE is operating under CA and served by multiple cells all in an unlicensed band, cross-carrier CSI-RS validation of periodical CSI-RS signals is performed to cope with the beam failure scenario. The motivation is that one DCI_New in one carrier validates the CSI-RS transmissions in all the carriers including self-carrier, i.e., combination of self-carrier scheduling and cross carrier scheduling. By doing so, even if the q_0 in one carrier has beam failure and the UE cannot receive DCI_New in this carrier, the UE can still receive DCI_New in other carriers for performing CSI-RS validation and BFR in this carrier. The network only needs to send validating DCI DCI_New over all beams in q_0, not q_1.

In the worst case, if all carriers experience beam failure in q_0 which can be different in different carriers, e.g., when the UE does not receive any validating DCI DCI_New for a timer T in any of the carriers, the UE returns to the $2^{nd}$ or 3rd solution above on at least one of the carriers to perform BFR. For $4^{th}$ solution, the gNB performs a set of directional LBT with the sensing beam QCL'ed with q_0 and q_1 beams on each carrier according to a multi-carrier directional LBT scheme. gNB sends the same DCI_New in each CORESET corresponds to one of q_0 beams on that carrier to UE if directional LBT on that beam is successful. The DCI_New does not only validate the transmission of periodic CSI-RS resources in q_0 and q_1 with a given COT duration in this self-scheduled carrier to the UE, but also validates cross carrier CSI-RS transmissions in q_0 and q_0 with a given COT duration in other carriers to the UE. Usually when the UE is served by multiple unlicensed carriers, the actual set of TCI states in q_0 or q_1 can all be different in each carrier. Also, each carrier can have the different number of TCI states in q_0 or q_. Taking a simple example, a UE is served by 3 unlicensed carriers, set q_0 at carrier i is defined as q_0_i which has two beams with TCI state TCI_0_i_1 and TCI_0_i_2, set q_1 at carrier 1 has two beams with TCI state TCI_1_i_1 and TCI_1_i_1 2 and the DCI_New transmitted in carrier 1 contains the following in Table 5.

TABLE 5

|  | TCI_0_i_1 | TCI_0_i_2 | TCI_1_i_1 | TCI_1_i_1 |
| --- | --- | --- | --- | --- |
| Carrier 1 (self-carrier) | LBT success, COT duration_101 | LBT success, COT duration_102 | LBT Fail | LBT Fail |
| Carrier 2 (cross-carrier) | LBT Fail | LBT Fail | LBT success, COT duration_211 | LBT success, COT duration_212 |

TABLE 5-continued

| | TCI_0_i_1 | TCI_0_i_2 | TCI_1_i_1 | TCI_1_i_1 |
|---|---|---|---|---|
| Carrier 3 (cross-carrier) | LBT success, COT duration_301 | LBT Fail | LBT Fail | LBT success, COT duration_312 |

The same DCI_New is sent over all the carriers, where DCI_New is sent in repetition over the set of CORESETs which the UE is monitoring in a carrier. The set of CORESETs have the TCI states which is a subset of q_0 at a given carrier. Thus, the UE does not need to monitor a huge set of CORESETs with TCI states corresponding to both the set q_0 and q_1, compared to previous solutions. However, the UE still needs to monitor the CORESETs with the TCI states corresponding to the subset of q_0 in all the serving carriers. In case beam failure occurs in one of the carriers, the UE cannot receive DCI_New for validating periodic CSI-RS used for beam failure detection and new beam selection on that carrier, but the UE can still receive the DCI_New from other carriers which contains the validation of CSI-RS transmissions from set q_0 and q_1 in this carrier and perform beam failure detection and new beam selection from set q_1 in this carrier correspondingly.

When all carriers experience beam failure over q_0, the UE cannot receive any DCI_New for the CSI-RS validation over all serving carriers. Thus, the UE served by primary carrier monitors the CORESETs which are QCL'ed with the set of q_1 beams in the primary carrier in order to receive DCI_New when the set of q_0 experiences the beam failure in all carriers (when gNB does not receive any uplink CSI-RS measurement report at primary carrier for a timer T, gNB sends DCI_New in replication over q_1 beams in primary carrier). Even when all carriers experience beam failure over q_0, the UE can still perform beam recovery at all carriers by the CSI-RS validation from received DCI_New over q_1 in the primary carrier. If all beams in q_0 and q_1 at all carriers fail, after UE cannot receive any DCI_New from any beams in q_0 and q_1 at any serving carrier for a timer K, UE assumes both q_0 and q_1 beams fail, and the UE starts performing BFR using SSB in the DRS windows at each carrier. In addition, there can also be CSI-RS transmissions in DRS window at each carrier, which can be used for further narrow beam refinement in this case.

In addition, when the UE is served by multiple unlicensed cells, the UE needs to monitor a set of validation DCI_New transmissions on all the configured multiple cells/carriers to potentially providing COT information over the set of TCI states corresponding to q_0 and q_1 in that one cell/carrier. The UE is likely to receive the COT information of one cell/carrier from receiving different copies of DCI_New at different carriers at different times, depending on the LBT outcomes at different carriers. The received multiple COT information for a particular cell/carrier at multiple cells should be consistent to reflect the gNB's LBT outcome and acquired total COT duration on that particular cell/carrier at time T For example, DCI_New received by the UE at time T+t1 has the remaining COT duration which is consistent with the remaining COT duration in DCI_New received by UE at time T+t2 (t2>t1). "consistent" means that for a set of symbols of a slot that are indicated by a DCI_New at time T+t1 as being within a remaining COT duration either by a COT duration field or by an SFI-index field, a UE does not expect to detect at a later time a DCI_New at time T+t2 with a remaining COT duration indicating, either by a COT duration field or by an SFI-index field, that any symbol from the set of symbols is not within a remaining COT duration. However, for a set of symbols of a slot that are not indicated by a DCI_New at time T+t1 as being within a remaining COT duration either by a COT duration field or by an SFI-index field, a UE can expect to detect at a later time a DCI_New at time T+t2 with a remaining COT duration indicating, either by a COT duration field or by an SFI-index field, that any symbol from the set of symbols is within a remaining COT duration.

If at least one carrier among all the carriers (e.g., the primary carrier) is in licensed band or lower frequency unlicensed band, then the DCI_New is only sent on the serving beam in licensed carrier or lower frequency unlicensed carrier and cross carrier validates the CSI-RS transmissions of q_0 and q_1 on other higher frequency unlicensed carriers. In this case, the network DCI_New transmission overhead and the UE complexity of simultaneously monitoring CORESETs is minimized. In particular, a UE always monitors the CORESET TCI states corresponding to the q_0 beams in the licensed or lower frequency unlicensed carrier for validating the periodic CSI-RS transmissions with the TCI states corresponding to q_0 and q_1 in each of other higher frequency unlicensed carriers and then performs the legacy BFR procedures in each of the higher frequency unlicensed (Scell) cell.

In this solution, one may need to differentiate normal/typical COT information (which can be on self-carrier) and a specific DCI for validation of periodical CSI-RS (which would be on cross carrier) at least for beam management. The main motivation of differentiation between normal COT and periodical CSI-RS validation is that network may not always want to provide COT information of all the serving cells/carriers using cross carrier from licensed cell. Alternatively, in case of multiple unlicensed cells, a network may not want to always provide COT information in multiple cells. For example, the network needs to send periodical CSI-RS validation related COT information either using cross carrier indication from licensed cell or using multi cell indication from another unlicensed cell. In this case, a cell would also transmit multi cell COT DCI. In both cases, such cross carrier or multi cell COT indication can also provide typical COT information in addition to periodical CSI-RS validation purposes. Differentiation of typical COT information on self-carrier and specific COT information on other multiple serving cells provides some flexibility to a network, in that the network would not have any other choice for periodical CSI-RS validation by transmitting COT information over all the serving cells. However, such a concern does not exist for other COT indication purposes. Then, there may need to be separation between these two to provide flexibility.

In the 5th solution, if the UE is operating under CA and served by multiple cells all in unlicensed band, the cross carrier (or multi-cell) DCI_New3 should trigger aperiodic CSI-RS for BFR to cope with the beam failure scenario. A difference between the $4^{th}$ and $5^{th}$ solution is that the 4th solution is GC PDCCH mainly validating periodic CSI-RS while the 5th solution is based on unicast PDCCH triggering aperiodic CSI-RS as shown in FIG. 6. In the current specification, for cross carrier DCI triggering aperiodic CSI-RS, one issue is that no PDCCH would be monitored in a self carrier by the UE when aperiodic CSI-RS triggering DCI is cross carrier monitored, which may be undesirable. One enhancement in the 5th solution is to introduce the exception that, at least for beam management, all other PDCCHs can still be monitored by UE in a self carrier while only aperiodic CSI-RS triggering DCI may also be monitored on cross carrier. For multi-cell aperiodic CSI-RS triggering DCI, the current CSI-request codepoint in the DCI designed for self-scheduled carrier is enhanced as follows.

The existing specification of aperiodic CSI-RS triggering in self-carrier is maintained as much as possible, and an RRC information element about which cells/carriers are triggered in each specific DCI CSI-request code point is added in the cross-carrier triggering scenario. When an aperiodic CSI-RS state is triggered, then each corresponding state in each cell/carrier as in the current RRC spec can be triggered. The mapping between specific DCI CSI-request code point and the set of specific cells or carriers are triggered are pre-configured by RRC. One example can be as follows:

have trigger states 0 and 1 in the different CC container as in the current specification. Each has its own association according to the current specification. Then, a separate RRC parameter indicates that the DCI in CC0 will trigger CC0 and CC1, i.e., new RRC contents are simply CC indices.

Alternatively, the legacy resource set definition and CSI-RS resource mappings defined for a single slot in a self-scheduled carrier are re-used and the legacy CSI-ResourceConfig for configuring the superset of CSI-RS resources in multi-cell is changed to be triggered by single DCI instead of single slot CSI-RS resource set in a single cell. In particular, one embodiment includes adding a set of new CSI trigger states in addition to the existing 64 states in CSI-AperiodicTriggerStateList, which are dedicated for the aperiodic CSI-RS and cross carrier scheduling with the superset of resources and multiple cells and pre-configured it with UE via RRC signaling. For example, for single DCI self and cross carrier scheduling the super resource set consisting of X (X>1) slots of CSI-RS resource sets in Y cells, a set of new CSI trigger states can be added to the existing 64 states in CSI-AperiodicTriggerStateList. In this case, the CSI_request codepoint in DCI should be extended to a few more bits, whereas the CSI-AperiodicTriggerStateList should be extended with maximum size of larger than

```
CSI-AssociatedReportConfigInfo ::= SEQUENCE {
    reportCortfigId          CSI-ReportConfigId,
    resourcesForChannel_carrier1      CHOICE {
        nzp-CSI-RS              SEQUENCE {
            resourceSet             INTEGER (1..maxNrofNZP-CSI-RS-
ResourceSetsPerConfig),
            qcl-info                SEQUENCE (SIZE(1..maxNrofAP-CSI-RS-ResourcesPerSet))
OF TCI-StateId
                                    OPTIONAL -- Cond Aperiodic
        },
        csi-SSB-ResourceSet     INTEGER (1..maxNrofCSI-SSB-ResourceSetsPerConfig)
    },
    resourcesForChannel_carrier2      CHOICE {
        nzp-CSI-RS              SEQUENCE {
            resourceSet             INTEGER (1..maxNrofNZP-CSI-RS-
ResourceSetsPerConfig),
            qcl-info                SEQUENCE (SIZE(1..maxNrofAP-CSI-RS-ResourcesPerSet))
OF TCI-StateId
                                    OPTIONAL -- Cond Aperiodic
        },
        csi-SSB-ResourceSet     INTEGER (1..maxNrofCSI-SSB-ResourceSetsPerConfig)
    },
    resourcesForChannel_carrier3      CHOICE {
        nzp-CSI-RS              SEQUENCE {
            resourceSet             INTEGER (1..maxNrofNZP-CSI-RS-
ResourceSetsPerConfig),
            qcl-info                SEQUENCE (SIZE(1..maxNrofAP-CSI-RS-ResourcesPerSet))
OF TCI-StateId
                                    OPTIONAL -- Cond Aperiodic
        },
        csi-SSB-ResourceSet     INTEGER (1..maxNrofCSI-SSB-ResourceSetsPerConfig)
    },
    csi-IM-ResourcesForInterference   INTEGER(1..maxNrofCSI-IM-ResourceSetsPerConfig)
                                    OPTIONAL, -- Cond CSI-IM-
ForInterference
    nzp-CSI-RS-ResourcesForInterference INTEGER (1..maxNrofNZP-CSI-RS-
ResourceSetsPerConfig)              OPTIONAL, -- Cond NZP-CSI-RS-
ForInterference
    ...
}
```

An even simpler concept does not change on association CSI-AssociatedReportConfigInfo element. Each component carrier (CC) has the legacy triggering states in the current specification. Then, a separate RRC parameter indicates that DCI in one CC will trigger itself and other CCs, i.e., new RRC contents are simply CC indices. Hence, for example, CC0 would have trigger states 0 and 1, and CC1 would also 64. Another embodiment is to reserve a set of CSI trigger states out of the maximum existing 64 states in CSI-AperiodicTriggerStateList for single DCI self and cross carrier scheduling the super resource set consisting of X (X>1) slot of CSI-RS resource sets and Y(Y>1) cells/carriers. In this case, the CSI_request codepoint in DCI remains the same as in the legacy configuration To support a single DCI scheduling superset of CSI-RS resources in multiple carriers, the legacy CSI-ResourceConfig is changed as shown in Table 6 below. That is, the NZP-CSI-RS-ResourceSet List is changed to be a set of NZP-CSI-RS-ResourceSet Lists, each of which corresponds to the CSI-RS signals scheduled in one of the carriers and consist of a set of instances each of which is a set of ResourceSetIDs in bracket composing the superset CSI-RS resource scheduled by single DCI DCI_New3.

TABLE 6

| CSI-ResourceConfig | | |
|---|---|---|
| CSI-ResourceConfigID | 112-K (New) | |
| CSI-RS-ResourceSetList 1 | NZP-CSI-RS-SSB | |
| | NZP-CSI-RS-ResourceSet List 1 | SEQUENCE {(ResourceSetID_1, ResourceSetID_2), (ResourceSetID_2, ResourceSetID_3), . . . up to 16 instances} |
| NZP-CSI-RS-ResourceSet List 2 | NZP-CSI-RS-ResourceSet List 2 | SEQUENCE {(ResourceSetID_2, ResourceSetID_1), (ResourceSetID_3, ResourceSetID_4), . . . up to 16 instances} |
| NZP-CSI-RS-ResourceSet List 3 | NZP-CSI-RS-ResourceSet List 3 | SEQUENCE {(ResourceSetID_2, ResourceSetID_1), (ResourceSetID_3, ResourceSetID_4), . . . up to 16 instances} |
| BWP-ID | 0-4 | |
| resourceType | Aperiodic | |

The motivation of solution 5 is similar to solution 4: one DCI_New3 in one carrier triggers the CSI-RS transmissions in all the carriers including self-carrier i.e., combination of self-carrier scheduling and cross carrier scheduling. By doing so, even if the $q\_0$ in one carrier has beam failure and UE cannot receive DCI_New3 in this carrier, the UE can still receive DCI_New3 in other carriers for triggering CSI-RS and BFR in this carrier. The network only needs to send triggering DCI_New3 over all beams in $q\_0$, not $q\_1$. Even if all carriers experience beam failure in $q\_0$ which can be different in different carriers, e.g., when the UE does not receive any triggering DCI DCI_New3 for a timer T in any of the carriers, the UE returns to the $2^{nd}$ or 3rd solution above on at least one of the carriers to perform BFR. For $5^{th}$ solution, in particular, the gNB performs a set of directional LBT with the sensing beams QCL'ed with $q\_0$ and $q\_1$ beams on each carrier according to a multi-carrier directional LBT scheme. The gNB sends the same DCI_New3 transmission in each CORESET corresponding to one of $q\_0$ beams on that carrier to the UE if directional LBT on that beam is successful. The DCI_New3 not only triggers the transmission of aperiodic CSI-RS resources in $q\_0$ and $q\_1$ in this self-scheduled carrier to the UE, but also triggers cross carrier CSI-RS transmissions in $q\_0$ and $q\_0$ in other carriers to the UE.

The same DCI_New3 transmission is sent over all the carriers, where DCI_New3 is sent in repetition over the set of CORESETs which the UE is monitoring in a carrier. The set of CORESETs have the TCI states which is a subset of $q\_0$ at a given carrier. Thus, the UE does not need to monitor a large CORESET with TCI states corresponds to both the set $q\_0$ and $q\_1$, compared to self-scheduled single carrier case. However, a UE should still monitor the CORESETs with the TCI states corresponds to the subset of $q\_0$ in all the serving carriers. In case beam failure happens in one of the carriers, the UE cannot receive DCI_New3 for triggering aperiodic CSI-RS used for beam failure detection and new beam selection on that carrier, but the UE can still receive the DCI_New3 from other carriers which contains the triggering information of CSI-RS transmissions from set $q\_0$ and $q\_1$ in this carrier and perform beam failure detection and new beam selection from set $q\_1$ in this carrier correspondingly. When all carriers experience beam failure over $q\_0$, the UE cannot receive any DCI_New3 for triggering the CSI-RS transmissions over all serving carriers. Thus, it is disclosed herein that the UE served by primary carrier monitors the CORESETs which are QCL'ed with the set of $q\_1$ beams in the primary carrier in order to receive DCI_New3 when the set of $q\_0$ experiences the beam failure in all carriers (when the gNB does not receive any uplink CSI-RS measurement report at primary carrier for a timer T, the gNB sends DCI_New3 in replication over $q\_1$ beams in primary carrier). Even when all carriers experience beam failure over $q\_0$, the UE can still perform beam recovery at all carriers by DCI triggering the aperiodic CSI-RS from received DCI_New3 over $q\_1$ in the primary carrier. If all beams in $q\_0$ and $q\_1$ at all carriers fail, after the UE cannot receive any DCI_New3 from any beams in $q\_0$ and $q\_1$ at any serving carrier for a timer K, UE assumes both $q\_0$ and $q\_1$ beams fail, and the UE start performing BFR using SSB in the DRS windows at each carrier. In addition, there can also be CSI-RS transmissions in DRS window at each carrier, which can be used for further narrow beam refinement.

If at least one carrier among all the carriers (e.g., the primary carrier) is in licensed band or lower frequency unlicensed band, then the DCI_New3 is only sent on the serving beam in licensed carrier or lower frequency unlicensed carrier and cross carrier triggers the CSI-RS transmissions of $q\_0$ and $q\_1$ on other higher frequency unlicensed carriers. In this case, the network DCI_New3 transmission overhead and the UE complexity of simultaneously monitoring CORESETs is minimized. In particular, the UE always monitors the CORESET TCI states correspond to the $q\_0$ beams in the licensed or lower frequency unlicensed carrier for cross carrier triggering the aperiodic CSI-RS transmissions with the TCI states corresponds to $q\_0$ and $q\_1$ in each of other higher frequency unlicensed carriers and then perform the legacy BFR procedures in each of the higher frequency unlicensed (Scell) cell.

When a UE is served by multiple unlicensed cells, the UE should monitor a set of triggering DCI_New3 on all the configured multiple cells/carriers to potentially trigger CSI-RS transmissions corresponds to $q\_0$ and $q\_1$ beams in that one cell/carrier. The UE is likely to receive different copies of DCI_New3 for triggering the CSI-RS transmissions in the same cell/carrier at different carriers at different times, depending on the LBT outcomes at different carriers. The received multiple DCI_New3 information for a particular cell/carrier at multiple cells does not have to be consistent on that particular cell/carrier. For example, DCI_New3 received by the UE at time T+t1 has triggered a superset1 of CSI-RS resources transmissions at that particular carrier which can be overwritten by a superset2 of CSI-RS resources transmissions at that particular carrier in DCI_New3 received by the UE at time T+t2 (t2>t1).

Figure 9:
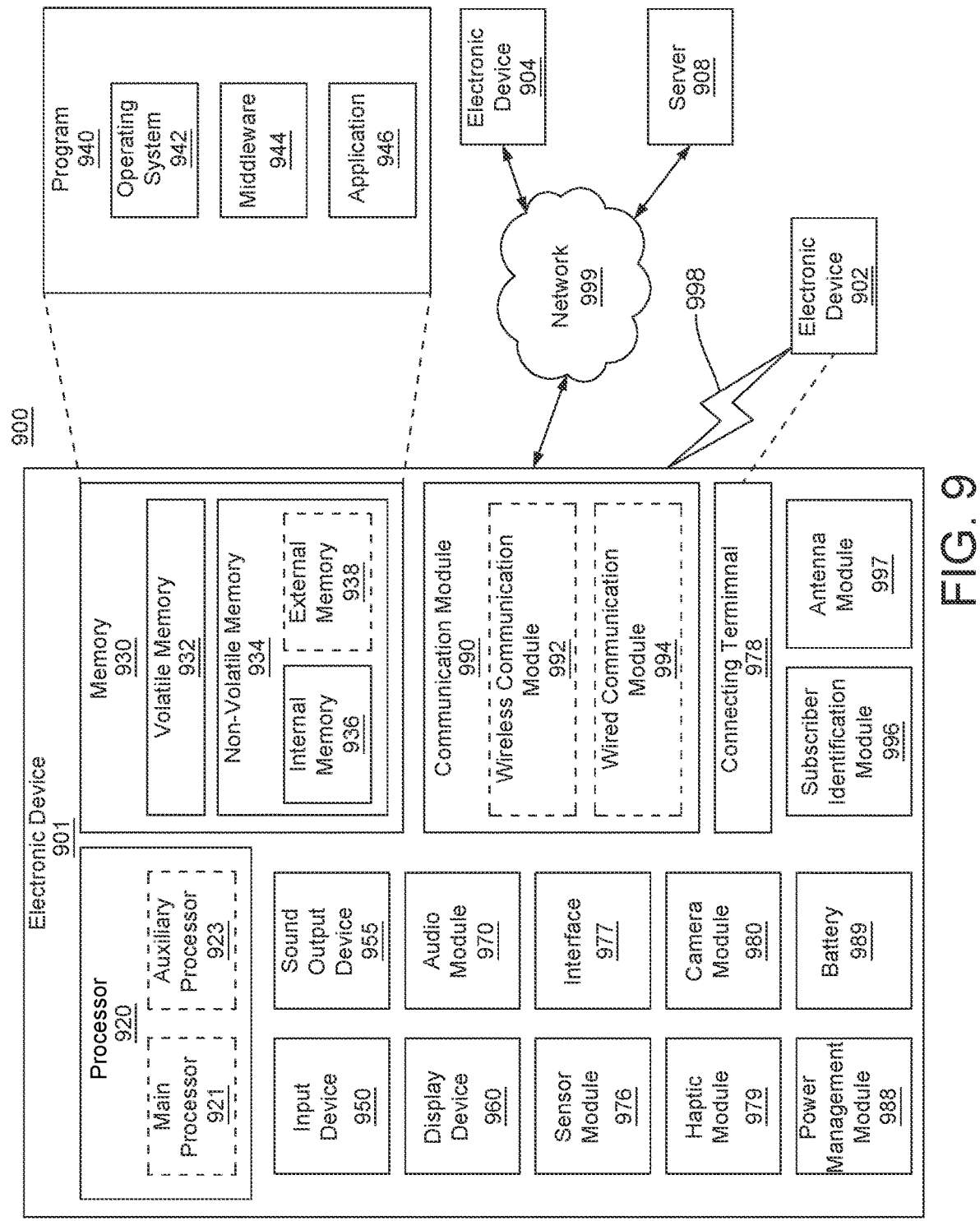
FIG. 9 is a block diagram of an electronic device in a network environment, according to an embodiment.

FIG. 9 is a block diagram of an electronic device in a network environment, according to an embodiment. Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 508. The electronic device 901 may include a processor 920, a memory 930, an input device 940, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 994. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920 and may perform various data processing or computations. As at least part of the data processing or computations, the processor 920 may load a command or data received from another component (e.g., the sensor module 946 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 542, middleware 944, or an application 946.

The input device 950 may receive a command or data to be used by another component (e.g., the processor 920) of the electronic device 901, from the outside (e.g., a user) of the electronic device 501. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes.

The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 701. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. An electronic device, comprising:
   at least one processor; and
   at least one memory operatively connected with the at least one processor, the at least one memory storing instructions, which when executed, instruct the at least one processor to:
   receive, on a control channel, a control channel message;
   receive a set of reference signals (RSs) in which each RS corresponds to a beam direction corresponding to a transmission state indicator (TCI) state;
   decode the control channel message to obtain a list of beam specific channel occupancy time (COT) information for one or more slots, wherein each beam specific COT information comprises COT duration indicator for each of the slots;
   determine, based on the beam specific COT information list, whether each RS of the set is valid; and
   receive, in the beam specific COT information, scheduling information related to RS transmissions corresponding to each beam corresponding to the TCI state,
   wherein validity of one or more RSs of the set of RSs is based on whether a duration of the set of RSs exceeds one or more corresponding slot durations provided by the COT duration indicator.

2. The electronic device of claim 1,
   wherein the control message is a group common downlink control message, and
   wherein, it is determined that each RS of the set is valid when the RS is transmitted after a successful listen before talk (LBT) channel access is performed and the RS is transmitted within the duration provided by the COT duration indicator for each of the slots.

3. The electronic device of claim 1,
wherein the beam specific COT information indicates search space group switching and an available resource block set at each slot within the COT per the beam direction or the TCI state.

4. The electronic device of claim 1,
wherein a starting time position and duration of a set of LBT-free RS transmissions to the electronic device are indicated by the scheduling information or are pre-configured and periodically repeated.

5. The electronic device of claim 4,
wherein the set of LBT-free RS transmissions is indicated as existing when the reference signals corresponding to the TCI state are outside the COT duration and within the indicated duration of the set of RS transmissions that are free of the LBT.

6. The electronic device of claim 5,
wherein the electronic device does not consider the received set of the reference signals for beam quality measurement corresponding to the beams or TCI states when the beam specific COT information indicates these set of reference signals are not within the indicated COT durations for those TCI states or those beam directions.

7. A system, comprising:
a device configured to:
receive a set of reference signals (RSs) and a control channel message, the control channel message notifying a slot format, a channel occupancy time (COT) duration, an available resource block set, and search space group switching, per a beam direction or a transmission state indicator (TCI) state, for signal transmission and reception by the device,
receive the set of RSs in which each RS corresponds to a beam direction,
decode the control channel message to obtain a list of beam specific COT information for one or more slots, each beam specific COT information including a channel occupancy time (COT) duration indicator for each of the slots,
determine, based on the beam-specific COT information list, whether each RS of the set is valid, and
receive, in the beam specific COT information, scheduling information related to RS transmissions corresponding to each beam corresponding to the TCI state,
wherein validity of one or more RSs of the set of RSs is based on whether a duration of the set of RSs exceeds one or more corresponding slot durations provided by the COT duration indicator.

8. The system of claim 7,
wherein the control message is a group common downlink control message, and
wherein, it is determined that each RS of the set is valid when the RS is transmitted after a successful listen before talk (LBT) channel access is performed and the RS is transmitted within the duration provided by the COT duration indicator for each of the slots.

9. The system of claim 7,
wherein the TCI information indicates search space group switching and available resource blocks at each slot within the COT per the beam direction or the TCI state.

10. The system of claim 7,
wherein the system receives, in the beam specific COT duration, reference signals corresponding to that beam or TCI state.

11. The system of claim 10,
wherein the received set of the reference signals for beam quality measurement corresponding to the beams or TCI states is not considered when the beam specific COT information indicates these set of reference signals are not within the indicated COT durations for those TCI states or those beam directions.

* * * * *